United States Patent
Turney et al.

(10) Patent No.: US 10,571,146 B2
(45) Date of Patent: Feb. 25, 2020

(54) AIR HANDLING UNIT AND ROOFTOP UNIT WITH PREDICTIVE CONTROL

(71) Applicant: Johnson Controls Technology Company, Auburn Hills, MI (US)

(72) Inventors: Robert D. Turney, Watertown, WI (US); Nishith R. Patel, Madison, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 113 days.

(21) Appl. No.: 15/963,860

(22) Filed: Apr. 26, 2018

(65) Prior Publication Data
US 2018/0340704 A1    Nov. 29, 2018

Related U.S. Application Data

(60) Provisional application No. 62/511,803, filed on May 26, 2017.

(51) Int. Cl.
*F24F 11/47*    (2018.01)
*G05B 13/04*    (2006.01)
(Continued)

(52) U.S. Cl.
CPC .............. *F24F 11/47* (2018.01); *F24F 11/77* (2018.01); *F24F 11/86* (2018.01); *G05B 13/048* (2013.01);
(Continued)

(58) Field of Classification Search
CPC .. F24F 11/47; F24F 11/77; F24F 11/86; F24F 2005/0067; F24F 11/62; F24F 5/00;
(Continued)

(56) References Cited

U.S. PATENT DOCUMENTS 9,436,179 B1 *  9/2016  Turney ................... G05B 23/02
2007/0203860 A1  8/2007  Golden et al.
(Continued)

FOREIGN PATENT DOCUMENTS

WO    WO-2017/062896 A1    4/2017

OTHER PUBLICATIONS

International Search Report and Written Opinion on International Patent Application No. PCT/US2018/029622 dated Aug. 28, 2018. 13 pages.

*Primary Examiner* — Emmanuel E Duke
(74) *Attorney, Agent, or Firm* — Foley & Lardner LLP

(57) ABSTRACT

An air handling unit (AHU) or rooftop unit (RTU) in a building HVAC system includes one or more powered components, a battery, and a predictive controller. The powered components include a fan configured to generate a supply airstream provided to one or more building zones. The battery is configured to store electric energy and discharge the stored electric energy for use in powering the powered components. The predictive controller is configured to optimize a predictive cost function to determine an optimal amount of electric energy to purchase from an energy grid and an optimal amount of electric energy to store in the battery or discharge from the battery for use in powering the powered components at each time step of an optimization period.

20 Claims, 11 Drawing Sheets

(51) Int. Cl.
*F24F 11/86* (2018.01)
*G06Q 50/06* (2012.01)
*F24F 11/77* (2018.01)
*G06Q 30/02* (2012.01)

(52) U.S. Cl.
CPC ......... *G06Q 30/0206* (2013.01); *G06Q 50/06* (2013.01)

(58) Field of Classification Search
CPC .. F24F 5/0046; F25B 27/002; G06Q 30/0206; G06Q 50/06; G05B 13/048; Y02B 10/00; Y02B 10/20; Y02B 10/10; Y02E 60/12; Y02E 10/40; Y02E 10/50; Y02E 10/56; Y02E 10/58; Y02E 10/563; Y02A 30/272; G05D 23/1919; G05D 23/1923; F03G 6/00; F03G 6/001
See application file for complete search history.

(56) References Cited

U.S. PATENT DOCUMENTS

| | | | |
|---|---|---|---|
| 2010/0106328 A1* | 4/2010 | Li | G05B 5/01 700/276 |
| 2011/0130886 A1* | 6/2011 | Drees | G05B 15/02 700/291 |
| 2011/0257911 A1* | 10/2011 | Drees | G05B 15/02 702/61 |
| 2012/0083927 A1 | 4/2012 | Nakamura et al. | |
| 2012/0084063 A1* | 4/2012 | Drees | G06Q 10/06 703/6 |
| 2012/0150707 A1* | 6/2012 | Campbell | G06Q 30/04 705/34 |
| 2013/0325377 A1* | 12/2013 | Drees | G06Q 10/06 702/61 |
| 2014/0214213 A1* | 7/2014 | Rockenfeller | G05D 23/1923 700/276 |
| 2015/0316902 A1* | 11/2015 | Wenzel | G06Q 10/04 700/291 |
| 2016/0313751 A1* | 10/2016 | Risbeck | G05D 23/1917 |
| 2016/0377306 A1 | 12/2016 | Drees et al. | |
| 2017/0089597 A1* | 3/2017 | Mueller | G05B 15/02 |
| 2017/0102675 A1 | 4/2017 | Drees | |
| 2017/0104337 A1 | 4/2017 | Drees | |
| 2017/0104449 A1 | 4/2017 | Drees | |
| 2018/0004171 A1 | 1/2018 | Patel et al. | |

* cited by examiner

AIR HANDLING UNIT AND ROOFTOP UNIT WITH PREDICTIVE CONTROL

CROSS-REFERENCE TO RELATED PATENT APPLICATION

This application claims the benefit of and priority to U.S. Provisional Patent Application No. 62/511,803 filed May 26, 2017, the entire disclosure of which is incorporated by reference herein.

BACKGROUND

The present disclosure relates generally to a HVAC system for a building and more particularly to an air handling unit (AHU) and rooftop unit (RTU) in a building HVAC system.

AHUs and RTUs are often used in a building HVAC system to provide airflow to one or more building zones. RTUs are typically located outside the building (e.g., on the rooftop of the building) and may include an integrated refrigeration circuit (e.g., a compressor, an evaporator, a condenser, etc.) configured to apply cooling to the airflow. Some RTUs include a burner or other heating element configured to apply heating to the airflow. AHUs are typically located inside the building and may include heating coils or cooling coils configured to receive a heated fluid or chilled fluid from a waterside system (e.g., a central plant).

AHUs and RTUs may include several components that consume power during operation. For example, an AHU may include a fan configured to deliver the heated or cooled airflow to the building zones, whereas a RTU may include both a fan and a compressor. It would be desirable to minimize the power consumption of these and other power-consuming components in order to reduce the cost of energy consumed by the AHU and RTU.

SUMMARY

One implementation of the present disclosure is an air handling unit (AHU) in a building HVAC system. The AHU includes one or more powered AHU components, a battery, and a predictive AHU controller. The powered AHU components include a fan configured to generate a supply airstream provided to one or more building zones. The battery is configured to store electric energy from an energy grid and discharge the stored electric energy for use in powering the powered AHU components. The a predictive AHU controller is configured to optimize a predictive cost function to determine an optimal amount of electric energy to purchase from the energy grid and an optimal amount of electric energy to store in the battery or discharge from the battery for use in powering the powered AHU components at each time step of an optimization period.

In some embodiments, the predictive cost function accounts for a cost of the electric energy purchased from the energy grid at each time step of the optimization period and a cost savings resulting from discharging stored electric energy from the battery at each time step of the optimization period.

In some embodiments, the predictive AHU controller is configured to receive energy pricing data defining a cost per unit of electric energy purchased from the energy grid at each time step of the optimization period and use the energy pricing data as inputs to the predictive cost function.

In some embodiments, the AHU includes one or more heating elements or cooling elements positioned within the supply airstream and configured to apply heating or cooling to the supply airstream. The predictive cost function may account for a cost of generating the heating or cooling applied to the supply airstream at each time step of the optimization period.

In some embodiments, the heating elements are configured to receive a heated fluid from a heater subplant and the cooling elements are configured to receive a chilled fluid from a chiller subplant. The predictive AHU controller may be configured to estimate the cost of generating the heating or cooling applied to the supply airstream based on a subplant curve for the heater subplant or the chiller subplant. The subplant curve may define a relationship between resource consumption and an amount of heating or cooling generated by the heater subplant or the chiller subplant.

In some embodiments, the predictive cost function accounts for a demand charge based on a maximum power consumption of the AHU during a demand charge period that overlaps at least partially with the optimization period. The predictive AHU controller can be configured to receive energy pricing data defining the demand charge and to use the energy pricing data as inputs to the predictive cost function.

In some embodiments, the predictive AHU controller includes an economic controller configured to determine optimal power setpoints for the powered AHU components and for the battery at each time step of the optimization period, a tracking controller configured to use the optimal power setpoints to determine optimal temperature setpoints for the building zones or the supply air stream at each time step of the optimization period, and an equipment controller configured to use the optimal temperature setpoints to generate control signals for the powered AHU components and for the battery at each time step of the optimization period.

Another implementation of the present disclosure is a rooftop unit (RTU) in a building HVAC system. The RTU includes one or more powered RTU components, a battery, and a predictive RTU controller. The powered RTU components include a fan configured to generate a supply airstream provided to one or more building zones. The battery is configured to store electric energy and discharge the stored electric energy for use in powering the powered RTU components. The predictive RTU controller is configured to optimize a predictive cost function to determine an optimal amount of electric energy to purchase from an energy grid and an optimal amount of electric energy to store in the battery or discharge from the battery for use in powering the powered RTU components at each time step of an optimization period.

In some embodiments, the RTU includes one or more photovoltaic panels configured to collect photovoltaic energy. The predictive RTU controller may be configured to determine an optimal amount of the photovoltaic energy to store in the battery and an optimal amount of the photovoltaic energy to be consumed by the powered RTU components at each time step of the optimization period.

In some embodiments, the predictive cost function accounts for a cost of the electric energy purchased from the energy grid and a cost savings resulting from discharging stored electric energy from the battery at each time step of the optimization period. The predictive RTU controller may be configured to receive energy pricing data defining a cost per unit of electric energy purchased from the energy grid at each time step of the optimization period and use the energy pricing data as inputs to the predictive cost function.

In some embodiments, the RTU includes a refrigeration circuit including an evaporator positioned within the supply airstream and configured to apply cooling to the supply airstream. The powered RTU components may include a compressor configured to compress a refrigerant in the refrigeration circuit and circulate the refrigerant through the evaporator. The predictive cost function may account for a cost of operating the compressor at each time step of the optimization period.

In some embodiments, the RTU includes burner positioned within the supply airstream and configured to apply heating to the supply airstream by burning a combustible fuel. The predictive cost function may account for a cost of the fuel consumed by the burner at each time step of the optimization period.

In some embodiments, the predictive cost function accounts for a demand charge based on a maximum power consumption of the RTU during a demand charge period that overlaps at least partially with the optimization period. The predictive RTU controller may be configured to receive energy pricing data defining the demand charge and to use the energy pricing data as inputs to the predictive cost function.

In some embodiments, the predictive RTU controller includes an economic controller configured to determine optimal power setpoints for the powered RTU components and for the battery at each time step of the optimization period, a tracking controller configured to use the optimal power setpoints to determine optimal temperature setpoints for the building zones or the supply air stream at each time step of the optimization period, and an equipment controller configured to use the optimal temperature setpoints to generate control signals for the powered RTU components and for the battery at each time step of the optimization period.

Another implementation of the present disclosure is a method for operating an air handling unit (AHU) or rooftop unit (RTU) in a building HVAC system. The method includes receiving, at the AHU or RTU, energy pricing data defining energy prices for each of a plurality of time steps in an optimization period and using the energy pricing data as inputs to a predictive cost function that defines a cost of operating the AHU or RTU over a duration of the optimization period. The method includes optimizing the predictive cost function to determine optimal power setpoints for one or more powered components of the AHU or RTU and for a battery of the AHU or RTU and using the optimal power setpoints to generate temperature setpoints for a zone temperature or supply air temperature affected by the AHU or RTU. The method includes using the temperature setpoints to generate control signals for the powered components of the AHU or RTU and operating the powered components of the AHU or RTU to achieve the temperature setpoints.

In some embodiments, optimizing the predictive cost function includes determining an optimal amount of electric energy to purchase from an energy grid and an optimal amount of electric energy to store in the battery or discharge from the battery for use in powering the powered components of the AHU or RTU at each time step of an optimization period.

In some embodiments, the method includes operating a fan of the AHU or RTU to generate a supply airstream and provide the supply airstream to one or more building zones. The fan may be one of the powered components of the AHU or RTU.

In some embodiments, the method includes operating one or more heating elements or cooling elements positioned within the supply airstream to apply heating or cooling to the supply airstream. The predictive cost function may account for a cost of generating the heating or cooling applied to the supply airstream at each time step of the optimization period.

In some embodiments, the method includes operating a compressor to circulate a refrigerant through an evaporator positioned within the supply airstream. The compressor may be one of the powered components of the AHU or RTU. The predictive cost function may account for a cost of operating the compressor at each time step of the optimization period.

In some embodiments, the predictive cost function accounts for a demand charge based on a maximum power consumption of the AHU or RTU during a demand charge period that overlaps at least partially with the optimization period. The method may include using the energy pricing data as inputs to the predictive cost function to define the demand charge.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
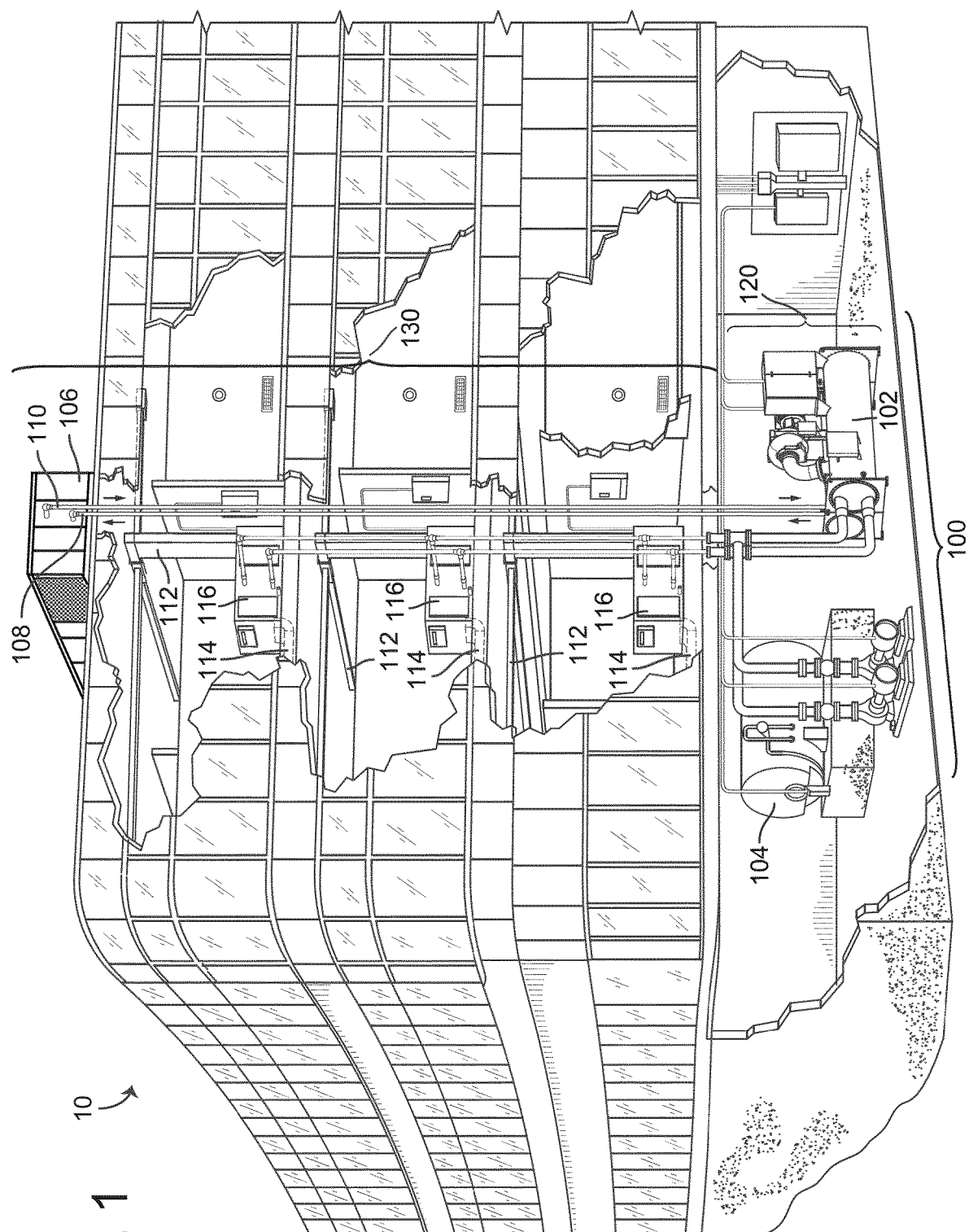
FIG. 1 is a drawing of a building equipped with a HVAC system, according to an exemplary embodiment.

Referring generally to the FIGURES, an air handling unit (AHU) and rooftop unit (RTU) with predictive controllers and components thereof are shown, according to various exemplary embodiments. The AHU and RTU can be implemented as components of a building HVAC system to provide heating and/or cooling to building zones. The AHU may include powered AHU components including a fan configured to generate a supply airstream provided to the building zones. In some embodiments, the AHU includes heating elements and/or cooling elements positioned within the supply air stream and configured to apply heating or cooling to the supply airstream. The heating elements and cooling elements may receive heated and chilled fluids, respectively, from a waterside system (e.g., a central plant) configured to provide heating and cooling to the AHU.

Similarly, the RTU may include powered RTU components including a fan configured to generate a supply airflow provided to the building zones. In some embodiments, the RTU includes a refrigeration circuit having a compressor positioned within the supply airstream and configured to provide cooling to the supply air stream. The refrigeration circuit may include a compressor configured to circulate a refrigerant through the evaporator. In some embodiments, the RTU includes a burner or other heating element positioned within the supply airstream and configured to apply heating to the supply airstream. In some embodiments, the RTU includes photovoltaic panels configured to collect solar energy and convert the solar energy into electric energy.

The AHU and RTU may include batteries configured to store electric energy (i.e., electricity) and to discharge the stored electric energy for use in powering the powered AHU/RTU components. The electric energy can be purchased from the energy grid and/or collected by the photovoltaic panels. In some embodiments, the batteries store energy during time periods when energy prices are low and discharge the stored energy when energy prices are high to reduce the cost of energy consumed by the AHU and RTU. The batteries can be controlled by a predictive controller configured to optimize the cost of operating the AHU/RTU.

The AHU and RTU may include predictive controllers configured to generate and provide control signals to the powered AHU/RTU components and to the batteries. In some embodiments, the predictive controllers use a multi-stage optimization technique to generate the control signals. For example, the predictive controllers may include an economic controller configured to determine the optimal amount of power to be consumed by the powered AHU/RTU components at each time step during the optimization period. The optimal amount of power to be consumed may minimize a cost function that accounts for the cost of energy consumed by the AHU/RTU and/or the waterside system that generates the chilled and heated fluids. The cost of energy may be based on time-varying energy prices from an electric utility (e.g., electricity prices, natural gas prices, etc.). In some embodiments, the economic controller is configured to determine an optimal amount of power to purchase from the energy grid (i.e., a grid power setpoint $P_{sp,grid}$) and an optimal amount of power to store or discharge from the battery (i.e., a battery power setpoint $P_{sp,bat}$) at each time step of the optimization period.

In some embodiments, the predictive controllers include a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, the predictive controllers use equipment models for the powered AHU/RTU components to determine an amount of heating or cooling that can be generated by the powered AHU/RTU components based on the optimal amount of power consumption. The predictive controllers can use a zone temperature model in combination with weather forecasts from a weather service to predict how the temperature of the building zone $T_{zone}$ will change based on the power setpoints and/or the temperature setpoints.

In some embodiments, the predictive controllers include an equipment controller configured to use the temperature setpoints to generate control signals for the powered AHU/RTU components. The control signals may include on/off commands, speed setpoints for the fan or compressor, position setpoints for actuators and valves, or other operating commands for individual devices of powered AHU/RTU components. For example, the equipment controller may receive a measurement of the supply air temperature $T_{sa}$ from a supply air temperature sensor and/or a measurement the zone temperature $T_{zone}$ from a zone temperature sensor. The equipment controller can use a feedback control process (e.g., PID, ESC, MPC, etc.) to adjust the speed of the fan or compressor of the AHU/RTU to drive the measured temperature to the temperature setpoint. These and other features of the AHU and RTU are described in greater detail below.

Building HVAC System

Referring now to FIG. 1, a perspective view of a building 10 is shown, according to some embodiments. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, a rooftop unit (RTU) 106, and several air handling units (AHUs) 116. Waterside system 120 may use boiler 104 and chiller 102 to heat or cool a working fluid (e.g., water, glycol, etc.) and may circulate the working fluid to AHUs 116. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHUs 116.

AHUs 116 may place the working fluid in a heat exchange relationship with an airflow passing through AHUs 116 (e.g., via one or more stages of cooling coils and/or heating coils). The airflow can be, for example, outside air, return air from within building 10, or a combination of both. AHUs 116 may transfer heat between the airflow and the working fluid to provide heating or cooling for the airflow. For example, AHUs 116 can include one or more fans or blowers configured to pass the airflow over or through a heat exchanger containing the working fluid. The working fluid may then return to chiller 102 or boiler 104.

Airside system 130 may deliver the airflow supplied by AHUs 116 (i.e., the supply airflow) to building 10 via air supply ducts 112 and may provide return air from building 10 to AHUs 116 via air return ducts 114. AHUs 116 can include various sensors (e.g., temperature sensors, pressure sensors, etc.) configured to measure attributes of the supply airflow. AHUs 116 may receive input from sensors located within AHU 106 and/or within the building zone and may adjust the flow rate, temperature, or other attributes of the supply airflow through AHU 106 to achieve setpoint conditions for the building zone.

In some embodiments, airside system 130 includes multiple AHUs 116. For example, airside system 130 is shown to include a separate AHU 116 on each floor or zone of building 10. In other embodiments, airside system 130 may include a single RTU 106 located on the roof of building 10. RTU 106 may include a refrigeration circuit configured to remove heat from an airflow passing through RTU 106 and/or a burner (e.g., a natural gas burner) or electric heating element configured to add heat to an airflow passing through RTU 106. The airflow heated or cooled by RTU 106 can be delivered to building 10 via supply air ducts 112.

In some embodiments, RTU 106 provides cooling for a condenser fluid used by chiller 102. For example, chiller 102 may transfer heat to a condenser fluid which can be routed to RTU 106 via piping 108. RTU 106 can remove heat from the condenser fluid and return the cooled condenser fluid to chiller 102 via piping 110. The heat removed by RTU 106 can be expelled outside building 10 via an exhaust airstream.

Air Handling Unit with Predictive Controller

Figure 2:
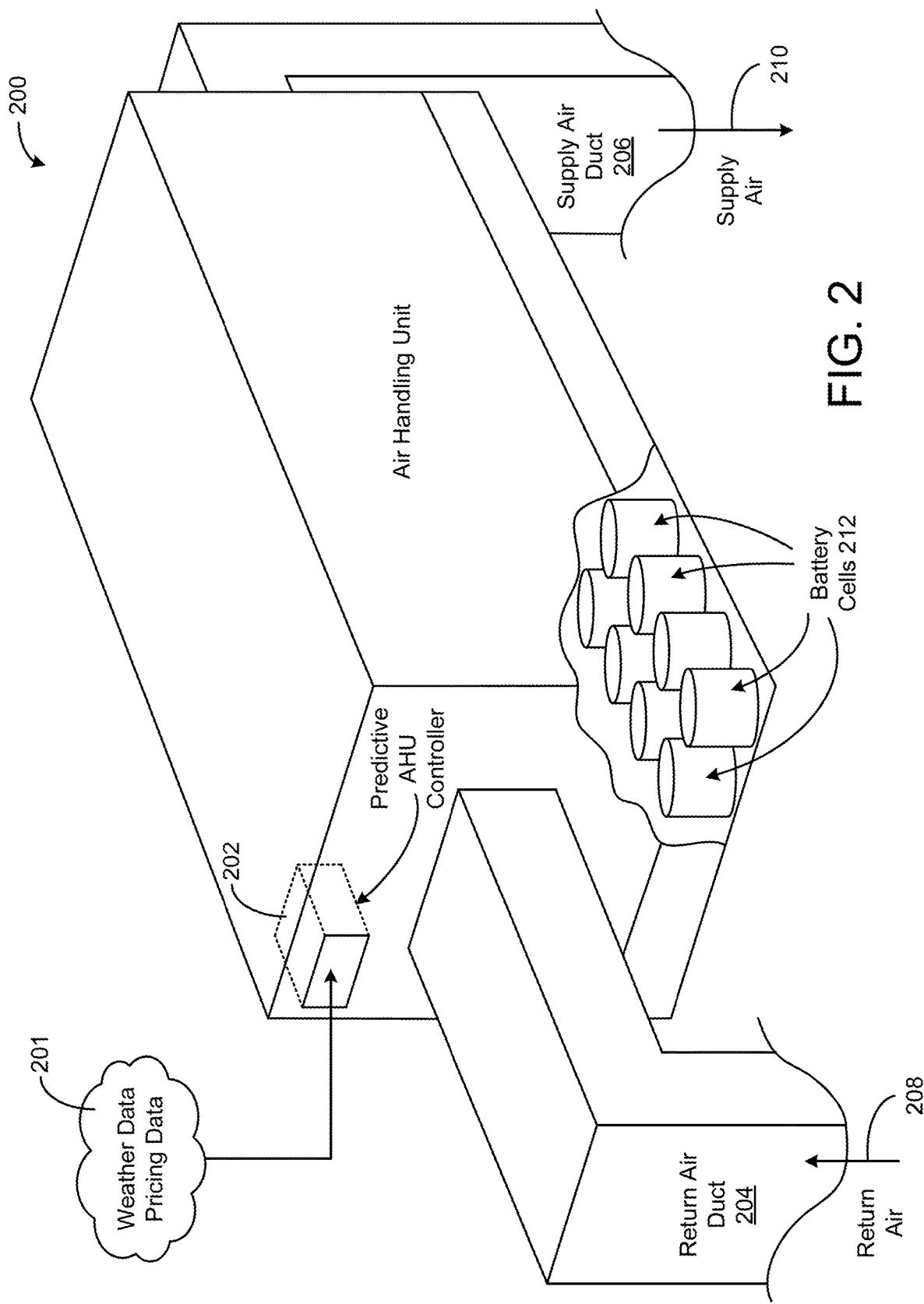
FIG. 2 is a drawing of an air handling unit (AHU) which can be used in the HVAC system of FIG. 1, according to an exemplary embodiment.

Referring now to FIG. 2, an air handling unit (AHU) 200 with a predictive AHU controller 202 is shown, according to some embodiments. In some embodiments, AHU 200 may be used as one of AHUs 116 in building 10. AHU 200 can be configured to apply heating and/or cooling to an airflow passing through AHU 200. For example, AHU 200 can receive return air 208 via a return air duct 204. Return air 208 can include outside air from outside building 10, inside air from within a building zone inside building 10, or a combination of both outside air and inside air. AHU 200 can apply heating and/or cooling to return air 208 (e.g., by passing return air 208 over heating coils or cooling coils) to generate supply air 210. The heated or cooled supply air 210 can be delivered to one or more building zones within building 10 via supply air duct 206.

In some embodiments, AHU 200 includes one or more battery cells 212. Battery cells 212 may form a battery 213 (shown in FIG. 3) configured to store and discharge electric energy (i.e., electricity). In some embodiments, battery 213 is charged using electricity from an external energy grid (e.g., provided by an electric utility). The electricity stored in battery 213 can be discharged to power one or more powered components of AHU 200 (e.g., a fan, fluid control valves, controller 202, etc.). Advantageously, battery 213 allows AHU 200 to draw electricity from the energy grid and charge battery 213 when energy prices are low and discharge the stored electricity when energy prices are high to timeshift the electric load of AHU 200. In some embodiments, battery 213 has sufficient energy capacity to power AHU 200 for approximately 4-6 hours when operating at maximum capacity such that battery 213 can be utilized during high energy cost periods and charged during low energy cost periods.

In some embodiments, predictive AHU controller 202 performs an optimization process to determine whether to charge or discharge battery 213 during each of a plurality of time steps that occur during an optimization period. Predictive AHU controller 202 may use weather and pricing data 201 to predict the amount of heating/cooling required and the cost of electricity during each of the plurality of time steps. Predictive AHU controller 202 can optimize an objective function that accounts for the cost of electricity purchased from the energy grid over the duration of the optimization period. In some embodiments, the objective function also accounts for the cost of heating or cooling the airflow that passes through AHU 200. Predictive AHU controller 202 can determine an amount of electricity to purchase from the energy grid and an amount of electricity to store or discharge from battery 213 during each time step. The objective function and the optimization performed by predictive AHU controller 202 are described in greater detail with reference to FIGS. 5-6.

Figure 3:
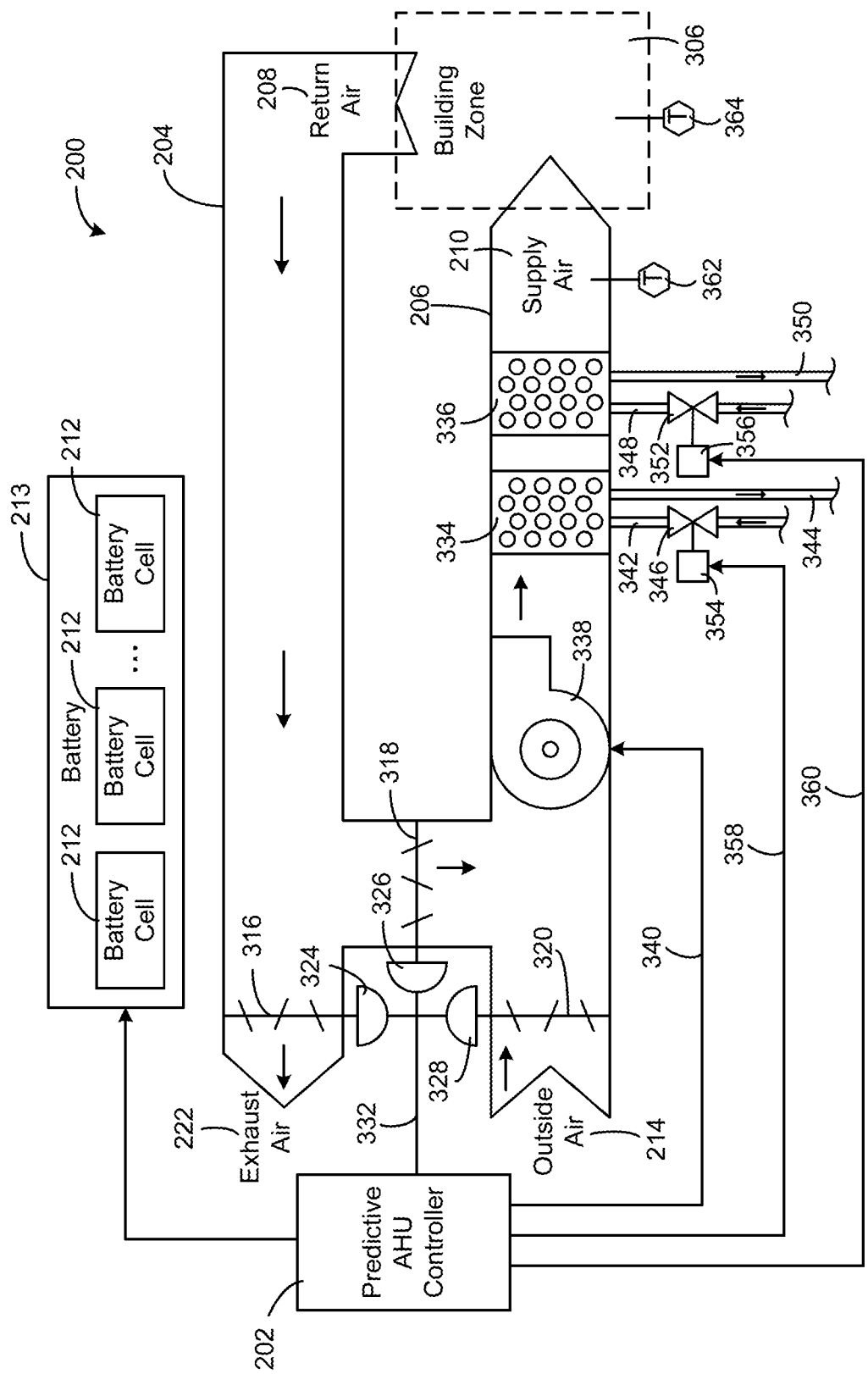
FIG. 3 is a block diagram illustrating the AHU of FIG. 2 in greater detail, according to an exemplary embodiment.

Referring now to FIG. 3, a block diagram illustrating AHU 200 in greater detail is shown, according to some embodiments. In FIG. 3, AHU 200 is shown to include an economizer-type air handling unit. Economizer-type AHUs vary the amount of outside air 214 and return air 208 used by the AHU for heating or cooling. For example, AHU 200 may receive return air 208 from building zone 306 via return air duct 208 and may deliver supply air 210 to building zone 306 via supply air duct 206. In some embodiments, AHU 200 is a rooftop unit located on the roof of building 10 (e.g., RTU 106 as shown in FIG. 1) or otherwise positioned to receive both return air 208 and outside air 214. AHU 200 can be configured to operate exhaust air damper 316, mixing damper 318, and outside air damper 320 to control an amount of outside air 214 and return air 208 that combine to form supply air 210. Any return air 208 that does not pass through mixing damper 318 can be exhausted from AHU 200 through exhaust damper 316 as exhaust air 222.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with predictive AHU controller 202 via a communications link 332. Actuators 324-328 may receive control signals from AHU controller 202 and may provide feedback signals to AHU controller 202. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 202 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 200 is shown to include a cooling coil 334, a heating coil 336, and a fan 338 positioned within supply air duct 206. Fan 338 can be configured to force supply air 210 through cooling coil 334 and/or heating coil 336 and provide supply air 210 to building zone 306. Predictive AHU controller 202 may communicate with fan 338 via communications link 340 to control a flow rate of supply air 210. In some embodiments, AHU controller 202 controls an amount of heating or cooling applied to supply air 210 by modulating a speed of fan 338.

Cooling coil 334 may receive a chilled fluid from a waterside system via piping 342 and may return the chilled fluid to the waterside system via piping 344. An example of a waterside system which can be used to supply the chilled fluid is described in greater detail with reference to FIG. 4. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 202) to modulate an amount of cooling applied to supply air 210.

Heating coil 336 may receive a heated fluid from the waterside system via piping 348 and may return the heated fluid to the waterside system via piping 350. An example of a waterside system which can be used to supply the heated fluid is described in greater detail with reference to FIG. 4. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 202) to modulate an amount of heating applied to supply air 210.

Each of valves 346 and 352 can be controlled by an actuator. For example, valve 346 can be controlled by actuator 354 and valve 352 can be controlled by actuator 356. Actuators 354-356 may communicate with AHU controller 202 via communications links 358-360. Actuators 354-356 may receive control signals from AHU controller 202 and may provide feedback signals to AHU controller 202. In some embodiments, AHU controller 202 receives a measurement of the supply air temperature from a temperature sensor 362 positioned in supply air duct 206 (e.g., downstream of cooling coil 334 and/or heating coil 336). AHU controller 202 may also receive a measurement of the temperature of building zone 306 from a temperature sensor 364 located in building zone 306.

In some embodiments, AHU controller 202 operates valves 346 and 352 via actuators 354-356 to modulate an amount of heating or cooling provided to supply air 210 (e.g., to achieve a setpoint temperature for supply air 210 or to maintain the temperature of supply air 210 within a setpoint temperature range). The positions of valves 346 and 352 affect the amount of heating or cooling provided to supply air 210 by cooling coil 334 or heating coil 336 and may correlate with the amount of energy consumed to achieve a desired supply air temperature. AHU 200 may control the temperature of supply air 210 and/or building zone 306 by activating or deactivating coils 334-336, adjusting a speed of fan 338, or a combination of both.

Waterside System

Figure 4:
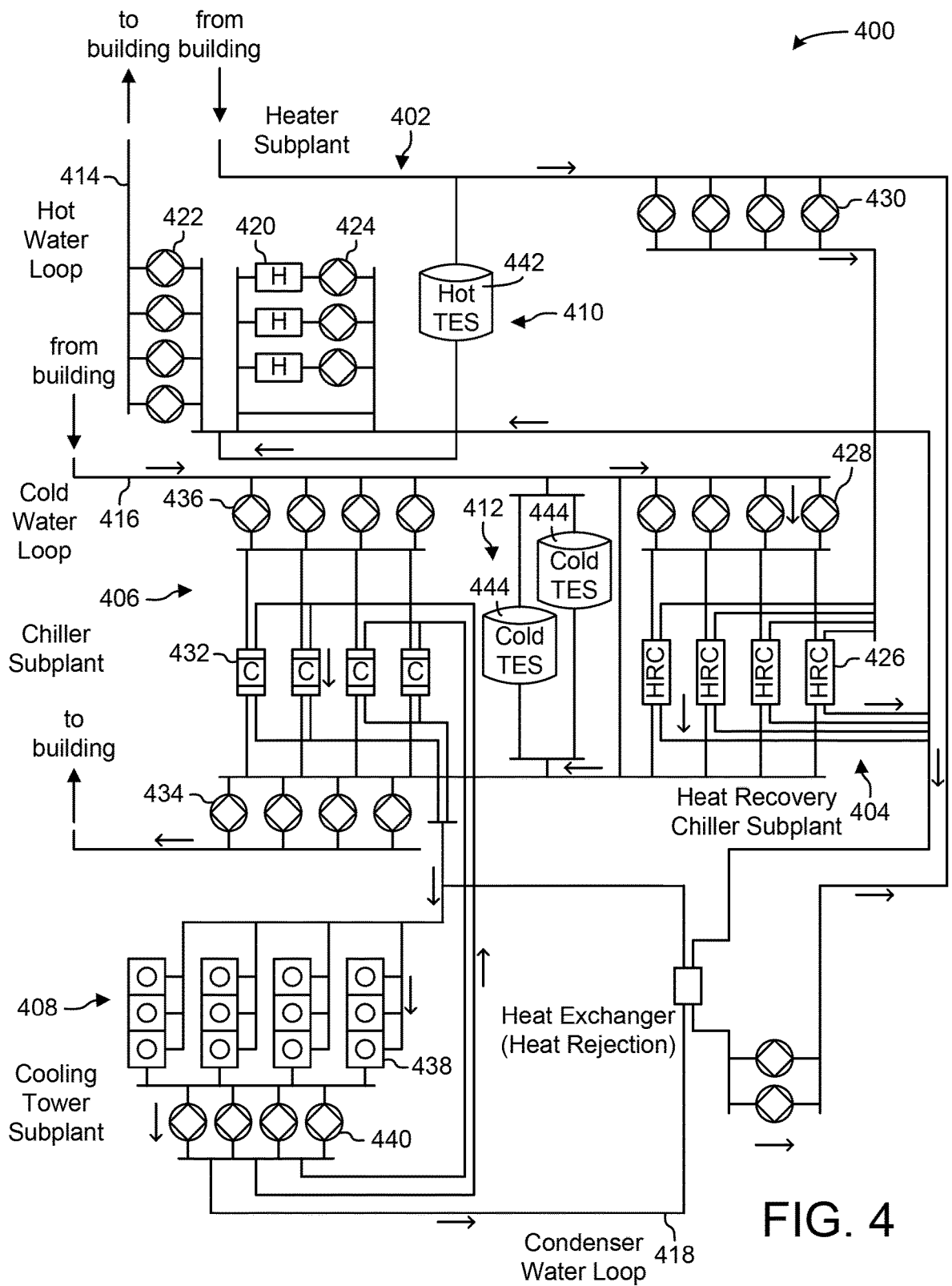
FIG. 4 is a block diagram of a waterside system which can be used to provide a heated fluid or a chilled fluid to the AHU of FIG. 2, according to an exemplary embodiment.

Referring now to FIG. 4, a block diagram of a waterside system 400 is shown, according to some embodiments. Waterside system 400 may operate to supply a heated or chilled fluid to AHU 200. In various embodiments, waterside system 400 may supplement or replace waterside system 120 in HVAC system 100 or can be implemented separate from HVAC system 100. When implemented in HVAC system 100, waterside system 400 can include a subset of the HVAC devices in HVAC system 100 (e.g., boiler 104, chiller 102, pumps, valves, etc.). The HVAC devices of waterside system 400 can be located within building 10 (e.g., as components of waterside system 120) or at an offsite location such as a central plant.

Waterside system 400 is shown as a central plant having a plurality of subplants 402-412. Subplants 402-412 are shown to include a heater subplant 402, a heat recovery chiller subplant 404, a chiller subplant 406, a cooling tower subplant 408, a hot thermal energy storage (TES) subplant 410, and a cold thermal energy storage (TES) subplant 412. Subplants 402-412 consume resources (e.g., water, natural gas, electricity, etc.) from utilities to serve thermal energy loads (e.g., hot water, cold water, heating, cooling, etc.) of a building or campus. For example, heater subplant 402 can be configured to heat water in a hot water loop 414 that circulates the hot water between heater subplant 402 and building 10. Chiller subplant 406 can be configured to chill water in a cold water loop 416 that circulates the cold water between chiller subplant 406 building 10. Heat recovery chiller subplant 404 can be configured to transfer heat from cold water loop 416 to hot water loop 414 to provide additional heating for the hot water and additional cooling for the cold water. Condenser water loop 418 may absorb heat from the cold water in chiller subplant 406 and reject the absorbed heat in cooling tower subplant 408 or transfer the absorbed heat to hot water loop 414. Hot TES subplant 410 and cold TES subplant 412 may store hot and cold thermal energy, respectively, for subsequent use.

Hot water loop 414 and cold water loop 416 may deliver the heated and/or chilled water to air handlers located on the rooftop of building 10 (e.g., RTU 106) or to individual floors or zones of building 10 (e.g., AHUs 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 402-412 to receive further heating or cooling.

Although subplants 402-412 are shown and described as heating and cooling water for circulation to a building, it is understood that any other type of working fluid (e.g., glycol, CO2, etc.) can be used in place of or in addition to water to serve thermal energy loads. In other embodiments, subplants 402-412 may provide heating and/or cooling directly to the building or campus without requiring an intermediate heat transfer fluid. These and other variations to waterside system 400 are within the teachings of the present disclosure.

Each of subplants 402-412 can include a variety of equipment configured to facilitate the functions of the subplant. For example, heater subplant 402 is shown to include a plurality of heating elements 420 (e.g., boilers, electric heaters, etc.) configured to add heat to the hot water in hot water loop 414. Heater subplant 402 is also shown to include several pumps 422 and 424 configured to circulate the hot water in hot water loop 414 and to control the flow rate of the hot water through individual heating elements 420. Chiller subplant 406 is shown to include a plurality of chillers 432 configured to remove heat from the cold water in cold water loop 416. Chiller subplant 406 is also shown to include several pumps 434 and 436 configured to circulate the cold water in cold water loop 416 and to control the flow rate of the cold water through individual chillers 432.

Heat recovery chiller subplant 404 is shown to include a plurality of heat recovery heat exchangers 426 (e.g., refrigeration circuits) configured to transfer heat from cold water loop 416 to hot water loop 414. Heat recovery chiller subplant 404 is also shown to include several pumps 428 and 430 configured to circulate the hot water and/or cold water through heat recovery heat exchangers 426 and to control the flow rate of the water through individual heat recovery heat exchangers 426. Cooling tower subplant 408 is shown to include a plurality of cooling towers 438 configured to remove heat from the condenser water in condenser water loop 418. Cooling tower subplant 408 is also shown to include several pumps 440 configured to circulate the condenser water in condenser water loop 418 and to control the flow rate of the condenser water through individual cooling towers 438.

Hot TES subplant 410 is shown to include a hot TES tank 442 configured to store the hot water for later use. Hot TES subplant 410 may also include one or more pumps or valves configured to control the flow rate of the hot water into or out of hot TES tank 442. Cold TES subplant 412 is shown to include cold TES tanks 444 configured to store the cold water for later use. Cold TES subplant 412 may also include one or more pumps or valves configured to control the flow rate of the cold water into or out of cold TES tanks 444.

In some embodiments, one or more of the pumps in waterside system 400 (e.g., pumps 422, 424, 428, 430, 434, 436, and/or 440) or pipelines in waterside system 400 include an isolation valve associated therewith. Isolation valves can be integrated with the pumps or positioned upstream or downstream of the pumps to control the fluid flows in waterside system 400. In various embodiments, waterside system 400 can include more, fewer, or different types of devices and/or subplants based on the particular configuration of waterside system 400 and the types of loads served by waterside system 400.

Predictive AHU Control System

Figure 5:
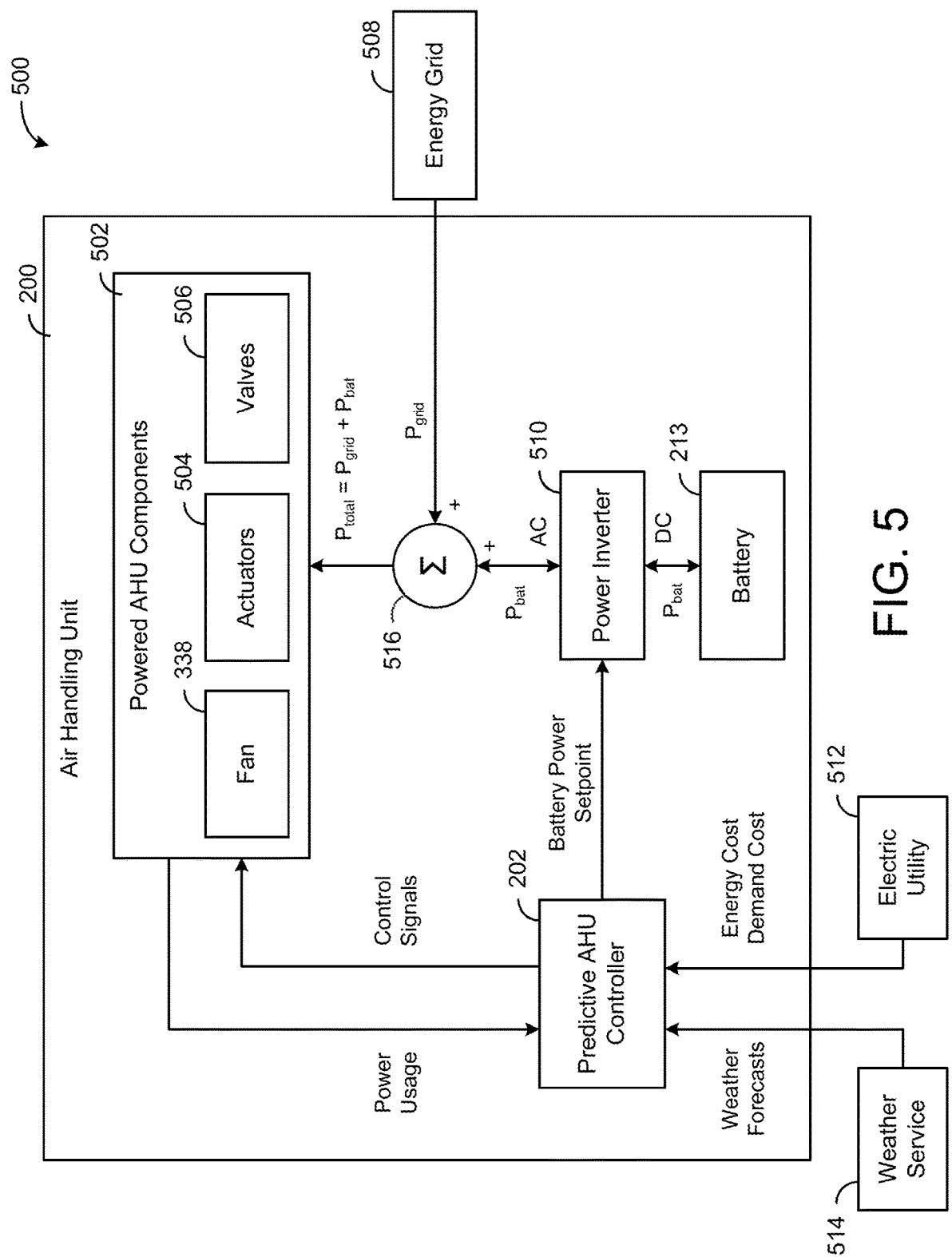
FIG. 5 is a block diagram of a predictive AHU control system including the AHU of FIG. 2, according to an exemplary embodiment.

Referring now to FIG. 5, a block diagram of a predictive AHU control system 500 is shown, according to some embodiments. Several of the components shown in control system 500 may be part of AHU 200. For example, AHU 200 may include powered AHU components 502, battery 213, predictive AHU controller 202, power inverter 510, and a power junction 516. Powered AHU components 502 may include any component of AHU 200 that consumes power (e.g., electricity) during operation. For example, powered AHU components 502 are shown to include fan 338, actuators 504, and valves 506. Actuators 504 may include any of the actuators shown in FIG. 3 (e.g., damper control actuators 324-328, valve control actuators 354-356, etc.), whereas valves 506 may include any of the valves shown in FIG. 3 (e.g., chilled fluid valve 346, heated fluid valve 352, etc.).

Power inverter 510 may be configured to convert electric power between direct current (DC) and alternating current (AC). For example, battery 213 may be configured to store and output DC power, whereas energy grid 508 and powered AHU components 502 may be configured to consume and provide AC power. Power inverter 510 may be used to convert DC power from battery 213 into a sinusoidal AC output synchronized to the grid frequency of energy grid 508 and/or powered AHU components 502. Power inverter 510 may also be used to convert AC power from energy grid 508 into DC power that can be stored in battery 213. The power output of battery 213 is shown as $P_{bat}$. $P_{bat}$ may be positive if battery 213 is providing power to power inverter 510 (i.e., battery 213 is discharging) or negative if battery 213 is receiving power from power inverter 510 (i.e., battery 213 is charging).

In some instances, power inverter 510 receives a DC power output from battery 213 and converts the DC power output to an AC power output that can be provided to powered AHU components 502. Power inverter 510 may synchronize the frequency of the AC power output with that of energy grid 508 (e.g., 50 Hz or 60 Hz) using a local oscillator and may limit the voltage of the AC power output to no higher than the grid voltage. In some embodiments, power inverter 510 is a resonant inverter that includes or uses LC circuits to remove the harmonics from a simple square wave in order to achieve a sine wave matching the frequency of energy grid 508. In various embodiments, power inverter 510 may operate using high-frequency transformers, low-frequency transformers, or without transformers. Low-frequency transformers may convert the DC output from battery 213 directly to the AC output provided to powered AHU components 502. High-frequency transformers may employ a multi-step process that involves converting the DC output to high-frequency AC, then back to DC, and then finally to the AC output provided to powered AHU components 502.

Power junction 516 is the point at which powered AHU components 502, energy grid 508, and power inverter 510 are electrically connected. The power supplied to power junction 516 from power inverter 510 is shown as $P_{bat}$. $P_{bat}$ may be positive if power inverter 510 is providing power to power junction 516 (i.e., battery 213 is discharging) or negative if power inverter 510 is receiving power from power junction 516 (i.e., battery 213 is charging). The power supplied to power junction 516 from energy grid 508 is shown as $P_{grid}$. $P_{bat}$ and $P_{grid}$ combine at power junction 516 to form $P_{total}$ (i.e., $P_{total} = P_{grid} + P_{bat}$). $P_{total}$ may be defined as the power provided to powered AHU components 502 from power junction 516. In some instances, $P_{total}$ is greater than $P_{grid}$. For example, when battery 213 is discharging, $P_{bat}$ may be positive which adds to the grid power $P_{grid}$ when $P_{bat}$ and $P_{grid}$ combine to form $P_{total}$. In other instances, $P_{total}$ may be less than $P_{grid}$. For example, when battery 213 is charging, $P_{bat}$ may be negative which subtracts from the grid power $P_{grid}$ when $P_{bat}$ and $P_{grid}$ combine to form $P_{total}$.

Predictive AHU controller 202 can be configured to control powered AHU components 502 and power inverter 510. In some embodiments, predictive AHU controller 202 generates and provides a battery power setpoint $P_{sp,bat}$ to power inverter 510. The battery power setpoint $P_{sp,bat}$ may include a positive or negative power value (e.g., kW) which causes power inverter 510 to charge battery 213 (when $P_{sp,bat}$ is negative) using power available at power junction 516 or discharge battery 213 (when $P_{sp,bat}$ is positive) to provide power to power junction 516 in order to achieve the battery power setpoint $P_{sp,bat}$.

In some embodiments, predictive AHU controller 202 generates and provides control signals to powered AHU components 502. Predictive AHU controller 202 may use a multi-stage optimization technique to generate the control signals. For example, predictive AHU controller 202 may include an economic controller configured to determine the optimal amount of power to be consumed by powered AHU components 502 at each time step during the optimization period. The optimal amount of power to be consumed may minimize a cost function that accounts for the cost of energy consumed by AHU 200 and/or waterside components that generate the chilled and heated fluids provided to AHU 200. The cost of energy may be based on time-varying energy prices from electric utility 512. In some embodiments, predictive AHU controller 202 determines an optimal amount of power to purchase from energy grid 508 (i.e., a grid power setpoint $P_{sp,grid}$) and an optimal amount of power to store or discharge from battery 213 (i.e., a battery power setpoint $P_{sp,bat}$) at each of the plurality of time steps. Predictive AHU controller 202 may monitor the actual power usage of powered AHU components 502 and may utilize the actual power usage as a feedback signal when generating the optimal power setpoints.

Predictive AHU controller 202 may include a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, predictive AHU controller 202 uses equipment models for powered AHU components 502 to determine an amount of heating or cooling that can be generated by AHU components 502 based on the optimal amount of power consumption. Predictive AHU controller 202 can use a zone temperature model in combination with weather forecasts from a weather service 514 to predict how the temperature of the building zone $T_{zone}$ will change based on the power setpoints and/or the temperature setpoints.

In some embodiments, predictive AHU controller 202 uses the temperature setpoints to generate the control signals for powered AHU components 502. The control signals may include on/off commands, speed setpoints for fan 338, position setpoints for actuators 504 and valves 506, or other operating commands for individual devices of powered AHU components 502. In other embodiments, the control signals may include the temperature setpoints (e.g., a zone temperature setpoint $T_{sp,zone}$, a supply air temperature setpoint $T_{sp,sa}$, etc.) generated by predictive AHU controller 202. The temperature setpoints can be provided to powered AHU components 502 or local controllers for powered AHU components 502 which operate to achieve the temperature setpoints. For example, a local controller for fan 338 may receive a measurement of the supply air temperature $T_{sa}$ from supply air temperature sensor 362 and/or a measurement the zone temperature $T_{zone}$ from zone temperature sensor 364. The local controller can use a feedback control process (e.g., PID, ESC, MPC, etc.) to adjust the speed of fan 338 to drive the measured temperature(s) to the temperature setpoint(s). Similar feedback control processes can be used to control the positions of actuators 504 and valves 506. The multi-stage optimization performed by predictive AHU controller 202 is described in greater detail with reference to FIG. 6.

Predictive AHU Controller

Figure 6:
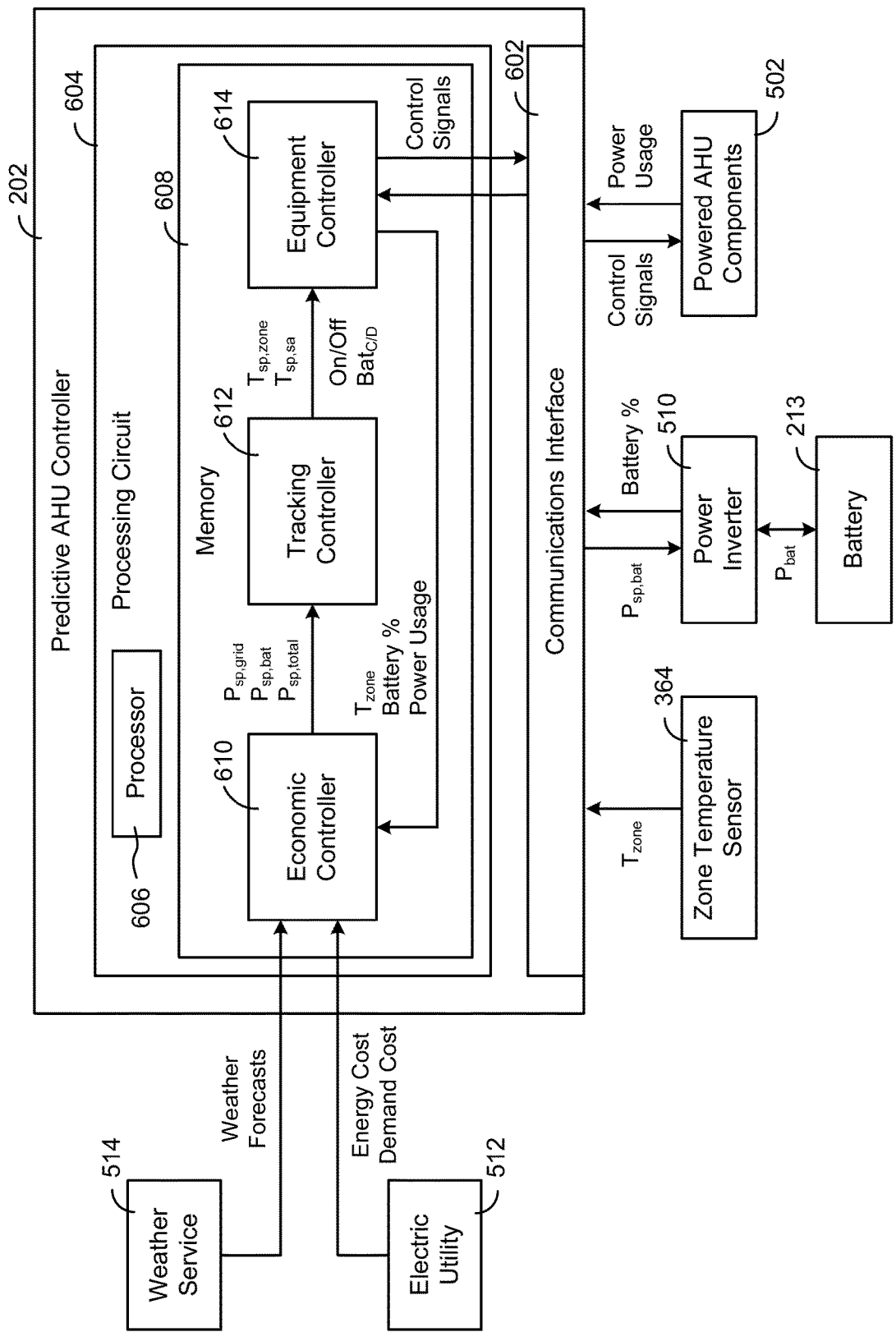
FIG. 6 is a block diagram illustrating a predictive AHU controller which can be used to monitor and control the AHU of FIG. 2, according to an exemplary embodiment.

Referring now to FIG. 6, a block diagram illustrating predictive AHU controller 202 in greater detail is shown, according to an exemplary embodiment. Predictive AHU controller 202 is shown to include a communications interface 602 and a processing circuit 604. Communications interface 602 may facilitate communications between controller 202 and external systems or devices. For example, communications interface 602 may receive measurements of the zone temperature $T_{zone}$ from zone temperature sensor 364 and measurements of the power usage of powered AHU components 502. In some embodiments, communications interface 602 receives measurements of the state-of-charge (SOC) of battery 213, which can be provided as a percentage of the maximum battery capacity (i.e., battery %). Communications interface 602 can receive weather forecasts from a weather service 514 and predicted energy costs and demand costs from an electric utility 512. In some embodiments, predictive AHU controller 202 uses communications interface 602 to provide control signals powered AHU components 502 and power inverter 510.

Communications interface 602 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 602 can include an Ethernet card and port for sending and receiving data via an Ethernet-based communications link or network. In another example, communications interface 602 can include a WiFi transceiver for communicating via a wireless communications network or cellular or mobile phone communications transceivers.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 is configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein. When processor 606 executes instructions stored in memory 608 for completing the various activities described herein, processor 606 generally configures controller 202 (and more particularly processing circuit 604) to complete such activities.

Still referring to FIG. 6, predictive AHU controller 202 is shown to include an economic controller 610, a tracking controller 612, and an equipment controller 614. Controllers 610-614 can be configured to perform a multi-state optimization process to generate control signals for power inverter 510 and powered AHU components 502. In brief overview, economic controller 610 can optimize a predictive cost function to determine an optimal amount of power to purchase from energy grid 508 (i.e., a grid power setpoint $P_{sp,grid}$), an optimal amount of power to store or discharge from battery 213 (i.e., a battery power setpoint $P_{sp,bat}$), and/or an optimal amount of power to be consumed by powered AHU components 502 (i.e., an AHU power setpoint $P_{sp,total}$) at each time step of an optimization period. Tracking controller 612 can use the optimal power setpoints $P_{sp,grid}$, $P_{sp,bat}$, and/or $P_{sp,total}$ to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). Equipment controller 614 can use the optimal temperature setpoints $T_{sp,zone}$ or $T_{sp,sa}$ to generate control signals for powered AHU components 502 that drive the actual (e.g., measured) temperatures $T_{zone}$ and/or $T_{sa}$ to the setpoints (e.g., using a feedback control technique). Each of controllers 610-614 is described in detail below.

Economic Controller

Economic controller 610 can be configured to optimize a predictive cost function to determine an optimal amount of power to purchase from energy grid 508 (i.e., a grid power setpoint $P_{sp,grid}$), an optimal amount of power to store or discharge from battery 213 (i.e., a battery power setpoint $P_{sp,bat}$), and/or an optimal amount of power to be consumed by powered AHU components 502 (i.e., an AHU power setpoint $P_{sp,total}$) at each time step of an optimization period. An example of a predictive cost function which can be optimized by economic controller 610 is shown in the following equation:

$$\min(J) = \sum_{k=1}^{h} C_{ec}(k)P_{total}(k)\Delta t + \sum_{k=1}^{h} C_{cold}(k)F_{cold}(k)\Delta t + \sum_{k=1}^{h} C_{hot}(k)F_{hot}(k)\Delta t + C_{DC}\max_{k}(P_{grid}(k)) - \sum_{k=1}^{h} C_{ec}(k)P_{bat}(k)\Delta t$$

where $C_{ec}(k)$ is the cost per unit of electricity (e.g., \$/kWh) purchased from electric utility 512 during time step k, $P_{total}(k)$ is the total power consumption (e.g., kW) of powered AHU components 502 during time step k, $C_{cold}(k)$ is the cost per unit of cooling (e.g., \$/ton-hour) needed to generate the chilled fluid supplied to AHU 200 at time step k, $F_{cold}(k)$ is the rate at which cooling is provided to AHU 200 by the chilled fluid (e.g., ton) at time step k, $C_{hot}(k)$ is the cost per unit of heating (e.g., \$/kWh) needed to generate the heated fluid supplied to AHU 200 at time step k, $F_{hot}(k)$ is the rate at which heating is provided to AHU 200 by the heated fluid (e.g., kW) at time step k, $C_{DC}$ is the demand charge rate (e.g., \$/kW), the max( ) term selects the maximum power consumption of AHU 200 (i.e., the maximum value of $P_{grid}(k)$) during any time step k of the optimization period, $P_{bat}(k)$ is the amount of power discharged from battery 213 during time step k, and $\Delta t$ is the duration of each time step k. Economic controller 610 can optimize the predictive cost function J over the duration of the optimization period (e.g., from time step k=1 to time step k=h) to predict the total cost of operating AHU 200 over the duration of the optimization period.

The first term of the predictive cost function J represents the cost of electricity consumed by powered AHU components 502 over the duration of the optimization period. The values of the parameter $C_{ec}(k)$ at each time step k can be defined by the energy cost information provided by electric utility 512. In some embodiments, the cost of electricity varies as a function of time, which results in different values of $C_{ec}(k)$ at different time steps k. The variable $P_{total}(k)$ is a decision variable which can be optimized by economic controller 610. In some embodiments, $P_{total}(k)$ is equal to the power consumption of fan 338 (i.e., $P_{total}(k)=P_{fan}(k)$) and $P_{fan}$ can be substituted for $P_{total}$ in the cost function J.

The second term of the predictive cost function J represents the cost of the cooling provided to AHU 200 by the chilled fluid over the duration of the optimization period. In some embodiments, the values of $C_{cold}(k)$ are provided as inputs to predictive AHU controller 202. In other embodiments, the values of $C_{cold}(k)$ can be determined by economic controller 610 based on attributes of the waterside equipment used to generate the chilled fluid provided to AHU 200. For example, if a chiller subplant 406 is used to generate the chilled fluid, a subplant curve for chiller subplant 406 can be used to model the performance of chiller subplant 406. In some embodiments, the subplant curve defines the relationship between input resources and output resources of chiller subplant 406. For example, the subplant curve for chiller subplant 406 may define the electricity consumption (e.g., kW) of chiller subplant 406 as a function of the amount of cooling provided by chiller subplant 406 (e.g., tons). Economic controller 610 can use the subplant curve for chiller subplant 406 to determine an amount of electricity consumption (kW) that corresponds to a given amount of cooling (tons). Several examples of subplant curves which can be used by economic controller 610 are described in greater detail in U.S. patent application Ser. No. 14/634,609 filed Feb. 27, 2015, the entire disclosure of which is incorporated by reference herein.

Economic controller 610 can use the subplant curve for chiller subplant 406 in combination with the energy prices from electric utility 512 to determine a value for the cost per unit of cooling $C_{cold}(k)$. For example, the following equation can be used by economic controller 610 to determine the value of the parameter $C_{cold}(k)$ for a given amount of cooling $F_{cold}(k)$:

$$C_{cold}(k)\left[\frac{\$}{\text{ton}\cdot\text{hour}}\right] = \theta_{subplant}(F_{cold}(k))\left[\frac{\text{kW}}{\text{ton}}\right] * C_{ec}(k)\left[\frac{\$}{\text{kWh}}\right]$$

where $\theta_{subplant}(k)$ is the slope of the subplant curve for chiller subplant 406 at the specified cooling rate $F_{cold}(k)$ and $C_{ec}(k)$ is the cost of electricity at time step k. The slope $\theta_{subplant}$ represents the amount of electric power (i.e., kW electricity) required to produce the corresponding amount of cooling (i.e., tons refrigeration). The cost of electricity $C_{ec}(k)$ can be defined by the energy cost information received from electric utility 512, whereas the slope of the subplant curve $\theta_{subplant}(F_{cold}(k))$ can be defined by the subplant curve for chiller subplant 406 as a function of the specified cooling rate $F_{cold}(k)$.

The third term of the predictive cost function J represents the cost of the heating provided to AHU 200 by the heated fluid over the duration of the optimization period. In some embodiments, the values of $C_{hot}(k)$ are provided as inputs to predictive AHU controller 202. In other embodiments, the values of $C_{hot}(k)$ can be determined by economic controller 610 based on attributes of the waterside equipment used to generate the heated fluid provided to AHU 200. For example, if a heater subplant 402 is used to generate the heated fluid, a subplant curve for heater subplant 402 can be used to model the performance of heater subplant 402. In some embodiments, the subplant curve defines the relationship between input resources and output resources of heater subplant 402. For example, the subplant curve for heater subplant 402 may define the electricity consumption (e.g., kW) and/or the natural gas consumption of heater subplant 402 as a function of the amount of heating provided by heater subplant 402 (e.g., kW). Economic controller 610 can use the subplant curve for heater subplant 402 to determine an amount of electricity consumption (kW) and/or natural gas consumption that corresponds to a given amount of heating (kW).

Economic controller 610 can use the subplant curve for heater subplant 402 in combination with the energy prices from electric utility 512 to determine a value for the cost per unit of heating $C_{hot}(k)$. For example, the following equation can be used by economic controller 610 to determine the value of the parameter $C_{hot}(k)$ for a given amount of cooling $F_{hot}(k)$:

$$C_{hot}(k)\left[\frac{\$}{\text{kWh}}\right] = \theta_{subplant}(F_{hot}(k))\left[\frac{\text{kW}}{\text{kW}}\right] * C_{ec}(k)\left[\frac{\$}{\text{kWh}}\right]$$

where $\theta_{subplant}(k)$ is the slope of the subplant curve for heater subplant 402 at the specified heating rate $F_{hot}(k)$ and $C_{ec}(k)$ is the cost of electricity at time step k. The slope $\theta_{subplant}$ represents the amount of electric power (i.e., kW electricity) required to produce the corresponding amount of heating (i.e., kW heating). The cost of electricity $C_{ec}(k)$ can be defined by the energy cost information received from electric utility 512, whereas the slope of the subplant curve $\theta_{subplant}(F_{hot}(k))$ can be defined by the subplant curve for heater subplant 402 as a function of the specified heating rate $F_{hot}(k)$.

The fourth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 512. The variable $P_{grid}(k)$ is a decision variable which can be optimized by economic controller 610 in order to reduce the peak power usage max($P_{grid}(k)$) that occurs during the demand charge period. Load shifting may allow economic controller 610 to smooth momentary spikes in the electric demand of AHU 200 by storing energy in battery 213 when the power consumption of powered AHU components 502 is low. The stored energy can be discharged from battery 213 when the power consumption of powered AHU components 502 is high in order to reduce the peak power draw $P_{grid}$ from energy grid 508, thereby decreasing the demand charge incurred.

The final term of the predictive cost function J represents the cost savings resulting from the use of battery 213. Unlike the previous terms in the cost function J, the final term subtracts from the total cost. The values of the parameter $C_{ec}(k)$ at each time step k can be defined by the energy cost information provided by electric utility 512. In some embodiments, the cost of electricity varies as a function of time, which results in different values of $C_{ec}(k)$ at different time steps k. The variable $P_{bat}(k)$ is a decision variable which can be optimized by economic controller 610. A positive value of $P_{bat}(k)$ indicates that battery 213 is discharging, whereas a negative value of $P_{bat}(k)$ indicates that battery 213 is charging. The power discharged from battery 213 $P_{bat}(k)$ can be used to satisfy some or all of the total power consumption $P_{total}(k)$ of powered AHU components 502, which reduces the amount of power $P_{grid}(k)$ purchased from energy grid 508 (i.e., $P_{grid}(k)=P_{total}(k)-P_{bat}(k)$). However, charging battery 213 results in a negative value of $P_{bat}(k)$ which adds to the total amount of power $P_{grid}(k)$ purchased from energy grid 508.

Economic controller 610 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 610 can use battery 213 to perform load shifting by drawing electricity from energy grid 508 when energy prices are low and/or when the power consumed by powered AHU components 502 is low. The electricity can be stored in battery 213 and discharged later when energy prices are high and/or the power consumption of powered AHU components 502 is high. This enables economic controller 610 to reduce the cost of electricity consumed by AHU 200 and can smooth momentary spikes in the electric demand of AHU 200, thereby reducing the demand charge incurred.

Economic controller 610 can be configured to impose constraints on the optimization of the predictive cost function J. In some embodiments, the constraints include constraints on the temperature $T_{zone}$ of the building zone 306. Economic controller 610 can be configured to maintain the actual or predicted temperature $T_{zone}$ between an minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, economic controller 610 can model the temperature $T_{zone}$ of the building zone 306 as a function of the decision variables optimized by economic controller 610. In some embodiments, economic controller 610 models the temperature of the building zone using a heat transfer model. For example, the dynamics of heating or cooling the building zone can be described by the energy balance:

$$C\frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature), $\dot{Q}_{HVAC}$ is the amount of heating applied to the building zone by AHU 200, and $\dot{Q}_{other}$ is the external load, radiation, or other disturbance experienced by the building zone. In the previous equation, $\dot{Q}_{HVAC}$ represents heat transfer into the building zone by AHU 200 (i.e., the heating load) and therefore has a positive sign. However, if cooling is applied to the building zone rather than heating, the sign on $\dot{Q}_{HVAC}$ can be switched to a negative sign such that $\dot{Q}_{HVAC}$ represents the amount of cooling applied to the building zone by AHU 200 (i.e., the cooling load).

In some embodiments, the amount of heating or cooling $\dot{Q}_{HVAC}$ provided by AHU 200 can be defined as the difference between the heating load $F_{hot}$ and the cooling load $F_{cold}$ (i.e., $\dot{Q}_{HVAC}=F_{hot}-F_{cold}$). In some embodiments, the amount of heating or cooling $\dot{Q}_{HVAC}$ provided by AHU 200 is also a function of the fan power $P_{fan}$, which may be equivalent to the total power consumption $P_{total}$ of powered AHU components 502 (e.g., $P_{fan}=P_{total}$) Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 610 include the following air and mass zone models:

$$C_z \frac{dT_{zone}}{dt} = H_{az}(T_a - T_{zone}) + H_{mz}(T_m - T_{zone}) + \dot{Q}_{HVAC} + \dot{Q}_{other}$$

$$C_m \frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 610 include the following air, shallow mass, and deep mass zone models:

$$C_z \frac{dT_{zone}}{dt} = H_{az}(T_a - T_{zone}) + H_{sz}(T_s - T_{zone}) + \dot{Q}_{HVAC} + \dot{Q}_{other}$$

$$C_s \frac{dT_s}{dt} = H_{sz}(T_{zone} - T_s) + H_{ds}(T_d - T_s)$$

$$C_d \frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, economic controller 610 uses the weather forecasts from weather service 514 to determine appropriate values for the ambient air temperature $T_a$ and/or the external disturbance $\dot{Q}_{other}$ at each time step of the optimization period. Values of C and H can be specified as parameters of the building zone, received from tracking controller 612, received from a user, retrieved from memory 608, or otherwise provided as an input to economic controller 610. Accordingly, the temperature of the building zone $T_{zone}$ can be defined as a function of the amount of heating or cooling $\dot{Q}_{HVAC}$ applied to the building zone by AHU 200 using any of these heat transfer models. The manipulated variable $\dot{Q}_{HVAC}$ can be adjusted by economic controller 610 by adjusting the variables $F_{cold}$, $F_{hot}$, and/or $P_{total}$ in the predictive cost function J.

In some embodiments, economic controller 610 uses a model that defines the amount of heating or cooling $\dot{Q}_{HVAC}$ applied to the building zone by AHU 200 as a function of the power setpoints $P_{sp,grid}$ and $P_{sp,bat}$ provided by economic controller 610. For example, economic controller 610 can add the power setpoints $P_{sp,grid}$ and $P_{sp,bat}$ to determine the total amount of power $P_{total}$ that will be consumed by powered AHU components 502. In some embodiments, $P_{total}$ is equivalent to the power consumption of fan 338 (i.e., $P_{total}=P_{fan}$) and can be used by economic controller 610 to determine the airflow rate of supply air 210 through AHU 200. Economic controller 610 can use $P_{total}$ in combination with the amount of heating $F_{hot}$ applied to supply air 210 and/or the amount of cooling $F_{cold}$ applied to supply air 210 to determine the total amount of heating or cooling $\dot{Q}_{HVAC}$ applied to the building zone by AHU 200.

In some embodiments, economic controller 610 uses one or more models that define the amount of heating or cooling applied to the building zone by AHU 200 (i.e., $\dot{Q}_{HVAC}$) as a function of the zone temperature $T_{zone}$ and the zone temperature setpoint $T_{sp,zone}$ as shown in the following equation:

$$\dot{Q}_{HVAC} = f(T_{zone}, T_{sp,zone})$$

The models used by economic controller 610 can be imposed as optimization constraints to ensure that the amount of heating or cooling $\dot{Q}_{HVAC}$ provided by AHU 200 is not reduced to a value that would cause the zone temperature $T_{zone}$ to deviate from an acceptable or comfortable temperature range.

In some embodiments, economic controller 610 relates the amount of heating or cooling $\dot{Q}_{HVAC}$ provided by AHU 200 to the zone temperature $T_{zone}$ and the zone temperature setpoint $T_{sp,zone}$ using multiple models. For example, economic controller 610 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_1(T_{zone}, T_{sp,zone})$$

where $v_{air}$ is the rate of airflow to the building zone (i.e., the control action). In some embodiments, $v_{air}$ depends on the speed of fan 338 in AHU 200 and may be a function of $P_{total}$. Economic controller 610 can use an equipment model or manufacturer specifications for fan 338 to define $v_{air}$ as a function of $P_{total}$. The function $f_1$ can be identified from data. For example, economic controller 610 can collect measurements of $v_{air}$ and $T_{zone}$ and identify the corresponding value of $T_{sp,zone}$. Economic controller 610 can perform a system identification process using the collected values of $v_{air}$, $T_{zone}$, and $T_{sp,zone}$ as training data to determine the function $f_1$ that defines the relationship between such variables.

Economic controller 610 can use an energy balance model relating the control action $v_{air}$ to the amount of heating or cooling $\dot{Q}_{HVAC}$ provided by AHU 200 as shown in the following equation:

$$\dot{Q}_{HVAC} = f_2(v_{air})$$

where the function $f_2$ can be identified from training data. Economic controller 610 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided by AHU 200 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c \left[ \varepsilon + \frac{1}{\tau_I} \int_0^t \varepsilon(t')dt' \right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_I$ is the zone PI controller integral time, and E is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 614 and heat transfer in AHU 200, a nonlinear heating/cooling duty model can be used instead.

In addition to constraints on the zone temperature $T_{zone}$, economic controller 610 can impose constraints on the state-of-charge (SOC) and charge/discharge rates of battery 213. In some embodiments, economic controller 610 generates and imposes the following power constraints on the predictive cost function J:

$$P_{bat} \leq P_{rated}$$

$$-P_{bat} \leq P_{rated}$$

where $P_{bat}$ is the amount of power discharged from battery 213 and $P_{rated}$ is the rated battery power of battery 213 (e.g., the maximum rate at which battery 213 can be charged or discharged). These power constraints ensure that battery 213 is not charged or discharged at a rate that exceeds the maximum possible battery charge/discharge rate $P_{rated}$.

In some embodiments, economic controller 610 generates and imposes one or more capacity constraints on the predictive cost function J The capacity constraints may be used to relate the battery power $P_{bat}$ charged or discharged during each time step to the capacity and SOC of battery 213. The capacity constraints may ensure that the capacity of battery 213 is maintained within acceptable lower and upper bounds at each time step of the optimization period. In some embodiments, economic controller 610 generates the following capacity constraints:

$$C_a(k) - P_{bat}(k) \Delta t \leq C_{rated}$$

$$C_a(k) - P_{bat}(k) \Delta t \geq 0$$

where $C_a(k)$ is the available battery capacity (e.g., kWh) at the beginning of time step k, $P_{bat}(k)$ is the rate at which battery 213 is discharged during time step k (e.g., kW), $\Delta t$ is the duration of each time step, and $C_{rated}$ is the maximum rated capacity of battery 213 (e.g., kWh). The term $P_{bat}(k)\Delta t$ represents the change in battery capacity during time step k. These capacity constraints ensure that the capacity of battery 213 is maintained between zero and the maximum rated capacity $C_{rated}$.

In some embodiments, economic controller 610 generates and imposes one or more capacity constraints on the operation of powered AHU components 502. For example, powered AHU components 502 may have a maximum operating point (e.g., a maximum fan speed) which corresponds to a maximum power consumption $P_{total,max}$. Economic controller 610 can be configured to generate a constraint which limits the power $P_{total}$ provided to powered AHU components between zero and the maximum power consumption $P_{total,max}$ as shown in the following equation:

$$0 \leq P_{total} \leq P_{total,max}$$

$$P_{total} = P_{sp,grid} + P_{sp,bat}$$

where the total power $P_{total}$ provided to powered AHU components 502 is the sum of the grid power setpoint $P_{sp,grid}$ and the battery power setpoint $P_{sp,bat}$.

In some embodiments, economic controller 610 generates and imposes one or more capacity constraints on the operation of the waterside equipment that provides heating or cooling to AHU 200. For example, heating may be provided by heater subplant 402 and cooling may be provided by chiller subplant 406. The operation of heater subplant 402 and chiller subplant 406 may be defined by subplant curves for each of heater subplant 402 and chiller subplant 406. Each subplant curve may define the resource production of the subplant (e.g., tons refrigeration, kW heating, etc.) as a function of one or more resources consumed by the subplant (e.g., electricity, natural gas, water, etc.). Several examples of subplant curves which can be used by economic controller 610 are described in greater detail in U.S. patent application Ser. No. 14/634,609 filed Feb. 27, 2015.

Economic controller 610 can be configured to use the subplant curves to identify a maximum amount of heating $F_{hot,max}$ that can be provided by heater subplant 402 and a maximum amount of cooling $F_{cold,max}$ that can be provided by chiller subplant 406. Economic controller 610 can generate and impose a constraint that limits the amount of heating $F_{hot}$ provided by heater subplant 402 between zero and the maximum amount of heating $F_{hot,max}$. Similarly, economic controller 610 can generate and impose a constraint that limits the amount of cooling $F_{cold}$ provided by chiller subplant 406 between zero and the maximum amount of cooling $F_{cold,max}$. Examples of these constraints are shown in the following equations:

$$0 \leq F_{hot} \leq F_{hot,max}$$

$$0 \leq F_{cold} \leq F_{cold,max}$$

Economic controller 610 can optimize the predictive cost function J subject to the constraints to determine optimal values for the decision variables $P_{total}$, $F_{hot}$, $F_{cold}$, $P_{grid}$, and $P_{bat}$, where $P_{total} = P_{bat} + P_{grid}$. In some embodiments, economic controller 610 uses the optimal values for $P_{total}$, $P_{bat}$, and/or $P_{grid}$ to generate power setpoints for tracking controller 612. The power setpoints can include battery power setpoints $P_{sp,bat}$, grid power setpoints $P_{sp,grid}$, and/or AHU power setpoints $P_{sp,total}$ for each of the time steps k in the optimization period. Economic controller 610 can provide the power setpoints to tracking controller 612.

Tracking Controller

Tracking controller 612 can use the optimal power setpoints $P_{sp,grid}$, $P_{sp,bat}$, and/or $P_{sp,total}$ generated by economic controller 610 to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). In some embodiments, tracking controller 612 generates a zone temperature setpoint $T_{sp,zone}$ and/or a supply air temperature setpoint $T_{sp,sa}$ that are predicted to achieve the power setpoint $P_{sp,total}$ for AHU 200. In other words, tracking controller 612 may generate a zone temperature setpoint $T_{sp,zone}$ and/or a supply air temperature setpoint $T_{sp,sa}$ that cause AHU 200 to consume the optimal amount of power $P_{total}$ determined by economic controller 610.

In some embodiments, tracking controller 612 relates the power consumption of AHU 200 to the zone temperature $T_{zone}$ and the zone temperature setpoint $T_{sp,zone}$ using a power consumption model. For example, tracking controller 612 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_3(T_{zone}, T_{sp,zone})$$

where $v_{air}$ is the rate of airflow to the building zone (i.e., the control action).

In some embodiments, $v_{air}$ depends on the speed of fan 338 in AHU 200 and may be a function of $P_{total}$. Tracking controller 612 can use an equipment model or manufacturer specifications for fan 338 to translate $v_{air}$ into a corresponding power consumption value $P_{total}$. Accordingly, tracking controller 612 can define the power consumption $P_{total}$ of AHU 200 as a function of the zone temperature $T_{zone}$ and the zone temperature setpoint $T_{sp,zone}$. An example of such a model is shown in the following equation:

$$P_{total} = f_4(T_{zone}, T_{sp,zone})$$

The function $f_4$ can be identified from data. For example, tracking controller 612 can collect measurements of $P_{total}$ and $T_{zone}$ and identify the corresponding value of $T_{sp,zone}$. Tracking controller 612 can perform a system identification process using the collected values of $P_{total}$, $T_{zone}$, and $T_{sp,zone}$ as training data to determine the function $f_4$ that defines the relationship between such variables.

Tracking controller 612 may use a similar model to determine the relationship between the total power consumption $P_{total}$ of AHU 200 and the supply air temperature setpoint $T_{sp,sa}$. For example, tracking controller 612 can define the power consumption $P_{total}$ of AHU 200 as a function of the zone temperature $T_{zone}$ and the supply air temperature setpoint $T_{sp,zone}$. An example of such a model is shown in the following equation:

$$P_{total} = f_5(T_{zone}, T_{sp,sa})$$

The function $f_5$ can be identified from data. For example, tracking controller 612 can collect measurements of $P_{total}$ and $T_{zone}$ and identify the corresponding value of $T_{sp,sa}$. Tracking controller 612 can perform a system identification process using the collected values of $P_{total}$, $T_{zone}$, and $T_{sp,sa}$ as training data to determine the function $f_5$ that defines the relationship between such variables.

Tracking controller 612 can use the relationships between $P_{total}$, $T_{sp,zone}$, and $T_{sp,sa}$ to determine values for $T_{sp,zone}$ and $T_{sp,sa}$. For example, tracking controller 612 can receive the value of $P_{total}$ as an input from economic controller 610 (i.e., $P_{sp,total}$) and can use determine corresponding values of $T_{sp,zone}$ and $T_{sp,sa}$. Tracking controller 612 can provide the values of $T_{sp,zone}$ and $T_{sp,sa}$ as outputs to equipment controller 614.

In some embodiments, tracking controller 612 uses the battery power setpoint $P_{sp,bat}$ to determine the optimal rate $Bat_{C/D}$ at which to charge or discharge battery 213. For example, the battery power setpoint $P_{sp,bat}$ may define a power value (kW) which can be translated by tracking controller 612 into a control signal for power inverter 510 and/or equipment controller 614. In other embodiments, the battery power setpoint $P_{sp,bat}$ is provided directly to power inverter 510 and used by power inverter 510 to control the battery power $P_{bat}$.

Equipment Controller

Equipment controller 614 can use the optimal temperature setpoints $T_{sp,zone}$ or $T_{sp,sa}$ generated by tracking controller 612 to generate control signals for powered AHU components 502. The control signals generated by equipment controller 614 may drive the actual (e.g., measured) temperatures $T_{zone}$ and/or $T_{sa}$ to the setpoints. Equipment controller 614 can use any of a variety of control techniques to generate control signals for powered AHU components 502. For example, equipment controller 614 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for powered AHU components 502.

The control signals may include on/off commands, speed setpoints for fan 338, position setpoints for actuators 504 and valves 506, or other operating commands for individual devices of powered AHU components 502. In some embodiments, equipment controller 614 uses a feedback control technique (e.g., PID, ESC, MPC, etc.) to adjust the speed of fan 338 to drive the measured temperatures $T_{zone}$ and/or $T_{sa}$ to the temperature setpoints $T_{sp,zone}$ and/or $T_{sp,sa}$. Similarly, equipment controller 614 can use a feedback control technique to control the positions of actuators 504 and/or valves 506 to adjust the amount of heating or cooling applied to supply air 210 to drive the measured temperatures $T_{zone}$ and/or $T_{sa}$ to the temperature setpoints $T_{sp,zone}$ and/or $T_{sp,sa}$. Equipment controller 614 can provide the control signals to powered AHU components 502 to control the operation of powered AHU components 502, thereby causing powered AHU components 502 to affect the zone temperature $T_{zone}$ and/or the supply air temperature $T_{sa}$.

In some embodiments, equipment controller 614 is configured to provide control signals to power inverter 510. The control signals provided to power inverter 510 can include a battery power setpoint $P_{sp,bat}$ and/or the optimal charge/discharge rate $Bat_{C/D}$. Equipment controller 614 can be configured to operate power inverter 510 to achieve the battery power setpoint $P_{sp,bat}$. For example, equipment controller 614 can cause power inverter 510 to charge battery 213 or discharge battery 213 in accordance with the battery power setpoint $P_{sp,bat}$.

Rooftop Unit with Predictive Controller

Figure 7:
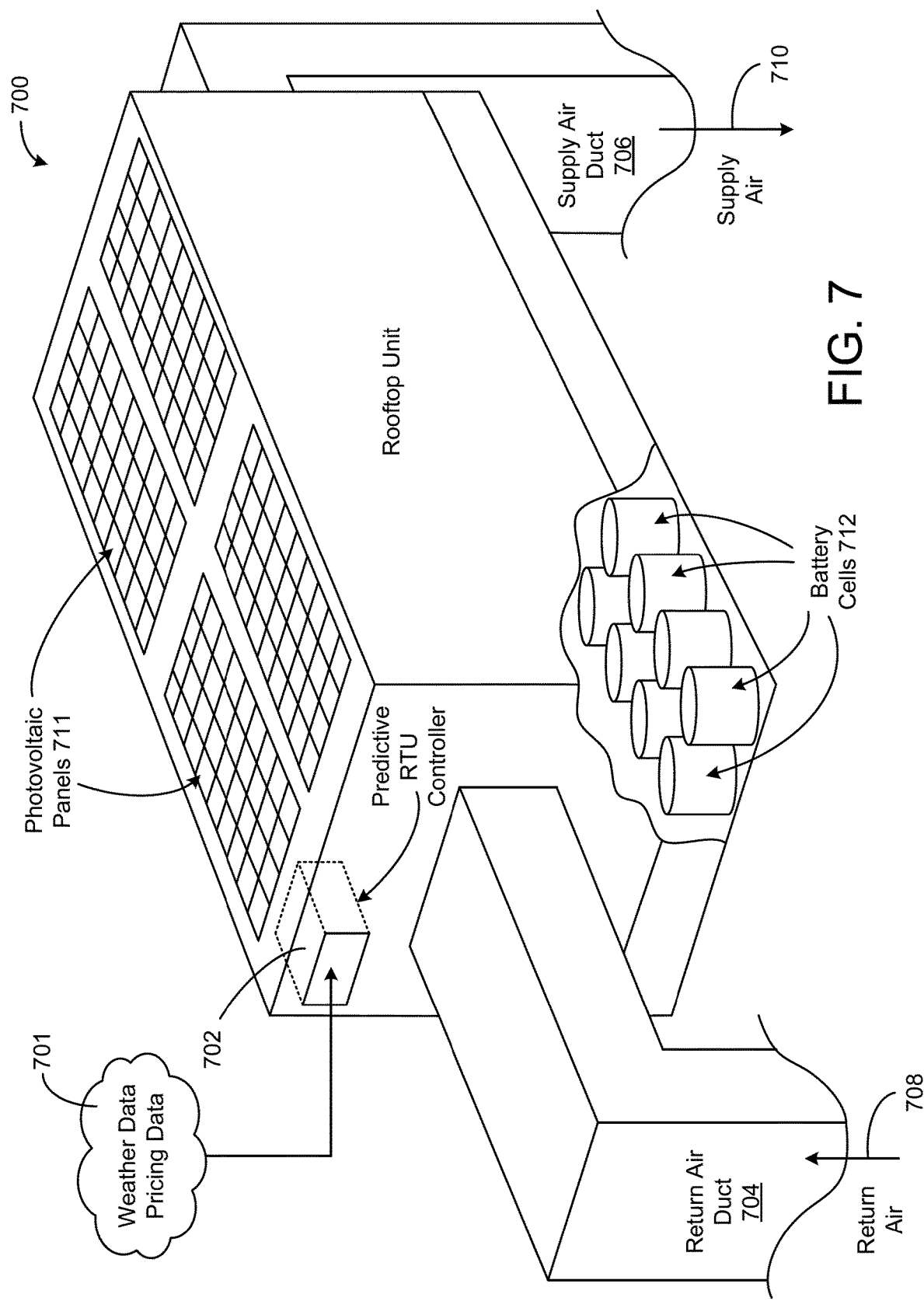
FIG. 7 is a drawing of a rooftop unit (RTU) which can be used in the HVAC system of FIG. 1, according to an exemplary embodiment.

Referring now to FIG. 7, a rooftop unit (RTU) with a predictive RTU controller 702 is shown, according to some embodiments. In some embodiments, RTU 700 may be used as RTU 106 in building 10. RTU 700 can be configured to apply heating and/or cooling to an airflow passing through RTU 700. For example, RTU 700 can receive return air 708 via a return air duct 704. Return air 708 can include outside air from outside building 10, inside air from within a building zone inside building 10, or a combination of both outside air and inside air. RTU 700 can apply heating and/or cooling to return air 708 (e.g., by passing return air 708 over a burner or an evaporator) to generate supply air 710. The heated or cooled supply air 710 can be delivered to one or more building zones within building 10 via supply air duct 706.

In some embodiments, RTU 700 includes one or more photovoltaic (PV) panels 711. PV panels 711 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form PV panels 711. Each PV panel 711 may include a plurality of linked photovoltaic cells. PV panels 711 may combine to form a photovoltaic array.

In some embodiments, PV panels 711 are configured to maximize solar energy collection. For example, RTU 700 may include a solar tracker (e.g., a GPS tracker, a sunlight sensor, etc.) that adjusts the angle of PV panels 711 so that PV panels 711 are aimed directly at the sun throughout the day. The solar tracker may allow PV panels 711 to receive direct sunlight for a greater portion of the day and may increase the total amount of power produced by PV panels 711. In some embodiments, RTU 700 includes a collection of mirrors, lenses, or solar concentrators configured to direct and/or concentrate sunlight on PV panels 711. The energy generated by PV panels 711 may be stored in battery cells 712 and/or used to power RTU 700.

In some embodiments, RTU 700 includes one or more battery cells 712. Battery cells 712 may form a battery 713 (shown in FIG. 8) configured to store and discharge electric energy (i.e., electricity). In some embodiments, battery 713 is charged using electricity from an external energy grid (e.g., provided by an electric utility). The electricity stored in battery 713 can be discharged to power one or more powered components of RTU 700 (e.g., a fan, a compressor, control valves, controller 702, etc.). Advantageously, battery 713 allows RTU 700 to draw electricity from the energy grid and charge battery 713 when energy prices are low and discharge the stored electricity when energy prices are high to time-shift the electric load of RTU 700. In some embodiments, battery 713 has sufficient energy capacity to power RTU 700 for approximately 4-6 hours when operating at maximum capacity such that battery 713 can be utilized during high energy cost periods and charged during low energy cost periods.

In some embodiments, predictive RTU controller 702 performs an optimization process to determine whether to charge or discharge battery 713 during each of a plurality of time steps that occur during an optimization period. Predictive RTU controller 702 may use weather and pricing data 701 to predict the amount of heating/cooling required and the cost of electricity during each of the plurality of time steps. Predictive RTU controller 702 can optimize an objective function that accounts for the cost of electricity purchased from the energy grid over the duration of the optimization period. In some embodiments, the objective function also accounts for the cost of heating or cooling the airflow that passes through RTU 700. Predictive RTU controller 702 can determine an amount of electricity to purchase from the energy grid and an amount of electricity to store or discharge from battery 713 during each time step. The objective function and the optimization performed by predictive RTU controller 702 are described in greater detail with reference to FIGS. 9-10.

Figure 8:
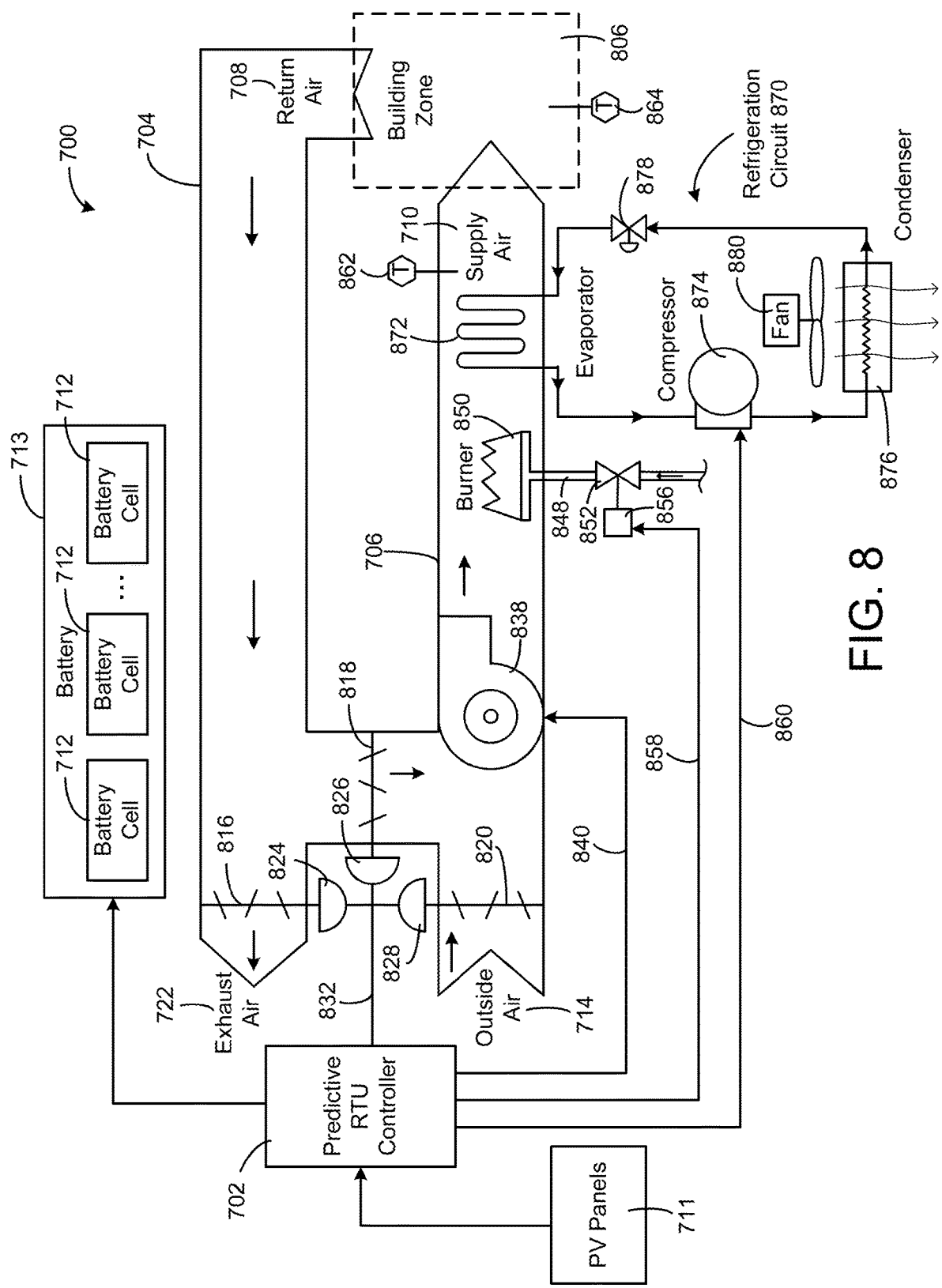
FIG. 8 is a block diagram illustrating the RTU of FIG. 7 in greater detail, according to an exemplary embodiment.

Referring now to FIG. 8, a block diagram illustrating RTU 700 in greater detail is shown, according to some embodiments. In FIG. 8, RTU 700 is shown to include an economizer-type rooftop unit. Economizer-type RTUs vary the amount of outside air 714 and return air 708 used by the RTU for heating or cooling. For example, RTU 700 may receive return air 708 from building zone 806 via return air duct 708 and may deliver supply air 710 to building zone 806 via supply air duct 706. In some embodiments, RTU 700 is a rooftop unit located on the roof of building 10 (e.g., RTU 106 as shown in FIG. 1) or otherwise positioned to receive both return air 708 and outside air 714. RTU 700 can be configured to operate exhaust air damper 816, mixing damper 818, and outside air damper 820 to control an amount of outside air 714 and return air 708 that combine to form supply air 710. Any return air 708 that does not pass through mixing damper 818 can be exhausted from RTU 700 through exhaust damper 816 as exhaust air 722.

Each of dampers 816-820 can be operated by an actuator. For example, exhaust air damper 816 can be operated by actuator 824, mixing damper 818 can be operated by actuator 826, and outside air damper 820 can be operated by actuator 828. Actuators 824-828 may communicate with predictive RTU controller 702 via a communications link 832. Actuators 824-828 may receive control signals from RTU controller 702 and may provide feedback signals to RTU controller 702. Feedback signals can include, for example, an indication of a current actuator or damper position, an amount of torque or force exerted by the actuator, diagnostic information (e.g., results of diagnostic tests performed by actuators 824-828), status information, commissioning information, configuration settings, calibration data, and/or other types of information or data that can be collected, stored, or used by actuators 824-828. RTU controller 702 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 824-828.

Still referring to FIG. 8, RTU 700 is shown to include a burner 850 and a refrigeration circuit 870. Burner 850 can be positioned within supply air duct 706 and configured to apply heating to supply air 710 flowing through supply air duct 706. Burner 850 can be configured to burn a fuel (e.g., natural gas) to generate heating for supply air 710. Burner 850 may receive fuel via piping 848. Valve 852 can be positioned along piping 848 to control a flow rate of the fuel to burner 850. In some embodiments, valve 852 is controlled by an actuator 856. Actuator 856 may communicate with RTU controller 702 via communications link 858. Actuator 856 may receive control signals from RTU controller 702 and may provide feedback signals to RTU controller 702. In some embodiments, burner 850 includes multiple stages of burners or other heating elements that can be independently activated and deactivated (e.g., by RTU controller 702) to modulate an amount of heating applied to supply air 710. In other embodiments, burner 850 can be replaced by one or more electric heating elements, heating coils, or other heating devices configured to apply heating to supply air 710.

Refrigeration circuit 870 is shown to include an evaporator 872, a compressor 874, a condenser 876, and an expansion device 878. Compressor 874 can be configured to circulate a refrigerant within refrigeration circuit 870 between evaporator 872 and condenser 876. Compressor 874 may compress the refrigerant to a high pressure, high temperature state. The compressed refrigerant may flow to condenser 876 in which the refrigerant rejects heat to the ambient environment. In some embodiments, a fan 880 is positioned to force air over or through condenser 876 to modulate the rate of heat transfer in condenser 876. The cooled refrigerant can flow from condenser 876 to expansion device 878. Expansion device 878 can be configured to expand the refrigerant to a low temperature, low pressure state. The expanded refrigerant may flow to evaporator 872, which may be positioned within supply air duct 706. Evaporator 872 may absorb heat from supply air 710 flowing through supply air duct 706 to provide cooling for supply air 710. The refrigerant can then return to compressor 874 to repeat the cycle.

In some embodiments, RTU controller 702 receives a measurement of the supply air temperature from a temperature sensor 862 positioned in supply air duct 706 (e.g., downstream of burner 850 and evaporator 872). RTU controller 702 may also receive a measurement of the temperature of building zone 806 from a temperature sensor 864 located in building zone 806. In some embodiments, RTU controller 702 operates fuel valve 852 via actuator 856 to modulate an amount of heating provided to supply air 710 (e.g., to achieve a setpoint temperature for supply air 710 or to maintain the temperature of supply air 710 within a setpoint temperature range). Similarly, RTU controller 702 may operate compressor 874 by providing control signals to compressor 874 via communications link 860. RTU controller 702 can activate, deactivate, and/or control the staging of compressor 874 to modulate an amount of cooling provided to supply air 710.

In some embodiments, RTU 700 includes a fan 838 positioned within supply air duct 706. Fan 838 can be configured to force supply air 710 through burner 850 and evaporator 872 and provide supply air 710 to building zone 806. Predictive RTU controller 702 may communicate with fan 838 via communications link 840 to control a flow rate of supply air 710. In some embodiments, RTU controller 702 controls an amount of heating or cooling applied to supply air 710 by modulating a speed of fan 838. RTU controller 702 may control the temperature of supply air 710 and/or building zone 806 by modulating the position of fuel valve 852, activating or deactivating compressor 874, adjusting a speed of fan 838, or a combination these control actions.

Predictive RTU Control System

Figure 9:
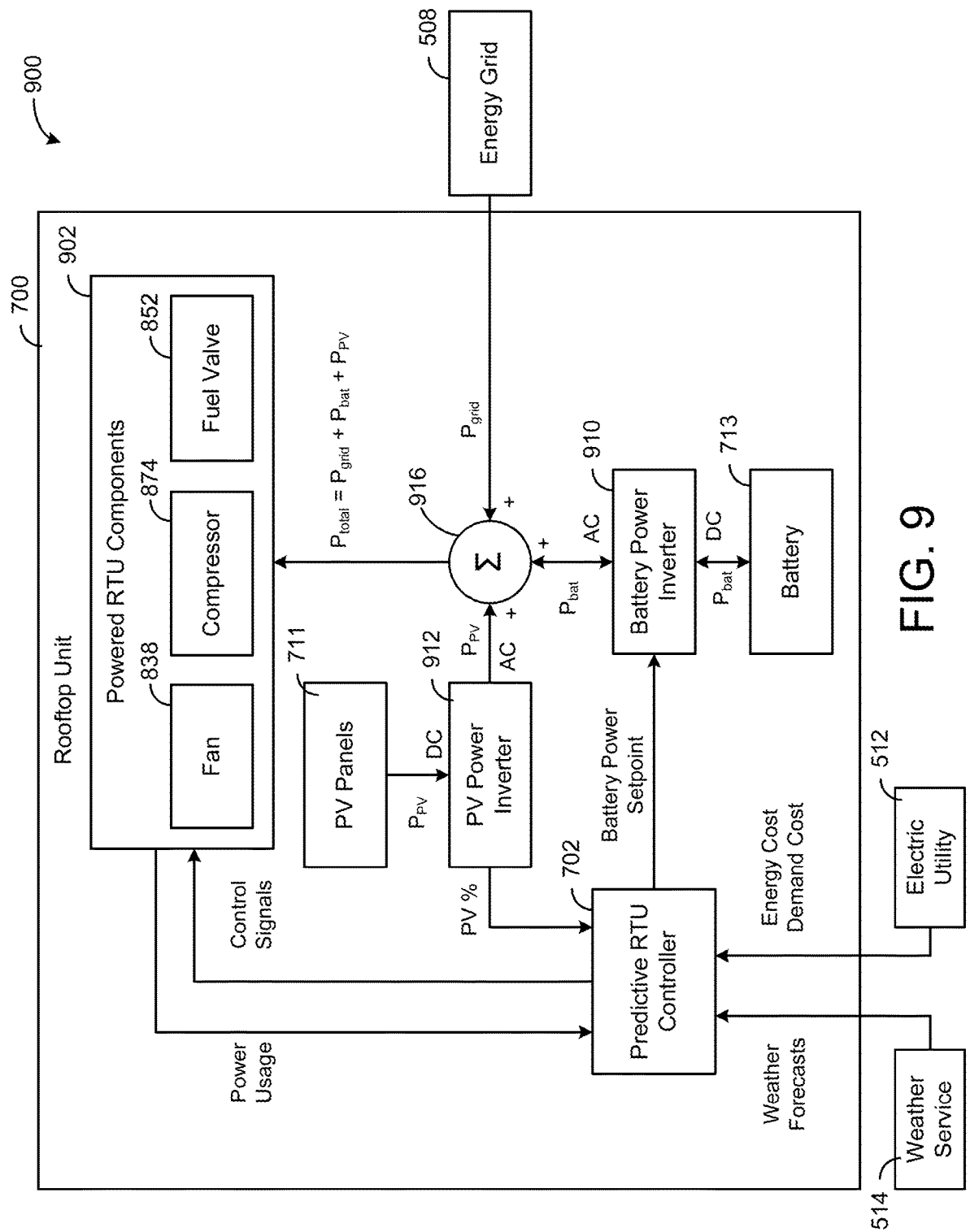
FIG. 9 is a block diagram of a predictive RTU control system including the RTU of FIG. 7, according to an exemplary embodiment.

Referring now to FIG. 9, a block diagram of a predictive RTU control system 900 is shown, according to some embodiments. Several of the components shown in control system 900 may be part of RTU 700. For example, RTU 700 may include powered RTU components 902, battery 713, PV panels 711, predictive RTU controller 702, battery power inverter 910, PV power inverter 912, and a power junction 916. Powered RTU components 902 may include any component of RTU 700 that consumes power (e.g., electricity) during operation. For example, powered RTU components 902 are shown to include fan 838, compressor 874, and fuel valve 852.

Battery power inverter 910 and PV power inverter 912 may be configured to convert electric power between direct current (DC) and alternating current (AC). For example, battery 713 may be configured to store and output DC power, whereas energy grid 508 and powered RTU components 902 may be configured to consume and provide AC power. Battery power inverter 910 may be used to convert DC power from battery 713 into a sinusoidal AC output synchronized to the grid frequency of energy grid 508 and/or powered RTU components 902. Battery power inverter 910 may also be used to convert AC power from energy grid 508 into DC power that can be stored in battery 713. The power output of battery 713 is shown as $P_{bat}$. $P_{bat}$ may be positive if battery 713 is providing power to power inverter 910 (i.e., battery 713 is discharging) or negative if battery 713 is receiving power from power inverter 910 (i.e., battery 713 is charging).

Similarly, PV power inverter 912 can be configured to convert DC power from PV panels 711 into a sinusoidal AC output synchronized to the grid frequency of energy grid 508 and/or powered RTU components 902. The power output of PV panels 711 is shown as $P_{PV}$. The power output $P_{PV}$ of PV panels 711 can be stored in battery 713 and/or used to power powered RTU components 902. In some embodiments, PV power inverter 912 measures the amount of power $P_{PV}$ generated by PV panels 711 and provides an indication of the PV power to predictive RTU controller 702. For example, PV power inverter 912 is shown providing an indication of the PV power percentage (i.e., PV %) to RTU controller 702. The PV power percentage may represent a percentage of the maximum PV power at which PV panels 711 are currently operating. In some embodiments, power inverters 910 and 912 include some or all of the features of power inverter 510, as described with reference to FIG. 5.

Power junction 916 is the point at which powered RTU components 902, energy grid 508, battery power inverter 910, and PV power inverter 912 are electrically connected. The power supplied to power junction 916 from battery power inverter 910 is shown as $P_{bat}$. $P_{bat}$ may be positive if battery power inverter 910 is providing power to power junction 916 (i.e., battery 713 is discharging) or negative if battery power inverter 910 is receiving power from power junction 916 (i.e., battery 713 is charging). The power supplied to power junction 916 from PV power inverter 912 is shown as $P_{PV}$. The power supplied to power junction 916 from energy grid 508 is shown as $P_{grid}$.

$P_{bat}$, $P_{PV}$, and $P_{grid}$ combine at power junction 916 to form $P_{total}$ (i.e. $P_{total} = P_{grid} + P_{bat} + P_{PV}$). $P_{total}$ may be defined as the power provided to powered RTU components 902 from power junction 916. In some instances, $P_{total}$ is greater than $P_{grid}$. For example, when battery 713 is discharging, $P_{bat}$ may be positive which adds to the grid power $P_{grid}$ when $P_{bat}$ combines with $P_{grid}$ and $P_{PV}$ to form $P_{total}$. Similarly, when PV panels 711 are supplying power, $P_{PV}$ may be positive which adds to the grid power $P_{grid}$ when $P_{PV}$ combines with $P_{grid}$ and $P_{bat}$ to form $P_{total}$. In other instances, $P_{total}$ may be less than $P_{grid}$. For example, when battery 713 is charging, $P_{bat}$ may be negative which subtracts from the grid power $P_{grid}$ when $P_{bat}$ combines with $P_{grid}$ and $P_{PV}$ to form $P_{total}$.

Predictive RTU controller 702 can be configured to control powered RTU components 902 and power inverters 910-912. In some embodiments, predictive RTU controller 702 generates and provides a battery power setpoint $P_{sp,bat}$ to power inverter 910. The battery power setpoint $P_{sp,bat}$ may include a positive or negative power value (e.g., kW) which causes power inverter 910 to charge battery 713 (when $P_{sp,bat}$ is negative) using power available at power junction 916 or discharge battery 713 (when $P_{sp,bat}$ is positive) to provide power to power junction 916 in order to achieve the battery power setpoint $P_{sp,bat}$.

In some embodiments, predictive RTU controller 702 generates and provides control signals to powered RTU components 902. Predictive RTU controller 702 may use a multi-stage optimization technique to generate the control signals. For example, predictive RTU controller 702 may include an economic controller configured to determine the optimal amount of power to be consumed by powered RTU components 902 at each time step during the optimization period. The optimal amount of power to be consumed may minimize a cost function that accounts for the cost of energy (e.g., electricity, gas, etc.) consumed by RTU 700. The cost of energy may be based on time-varying energy prices from electric utility 512. In some embodiments, predictive RTU controller 702 determines an optimal amount of power to purchase from energy grid 508 (i.e., a grid power setpoint $P_{sp,grid}$) and an optimal amount of power to store or discharge from battery 713 (i.e., a battery power setpoint $P_{sp,bat}$) at each of the plurality of time steps. Predictive RTU controller 702 may monitor the actual power usage of powered RTU components 902 and may utilize the actual power usage as a feedback signal when generating the optimal power setpoints.

Predictive RTU controller 702 may include a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, predictive RTU controller 702 uses equipment models for powered RTU components 902 to determine an amount of heating or cooling that can be generated by RTU components 902 based on the optimal amount of power consumption. Predictive RTU controller 702 can use a zone temperature model in combination with weather forecasts from a weather service 514 to predict how the temperature of the building zone $T_{zone}$ will change based on the power setpoints and/or the temperature setpoints.

In some embodiments, predictive RTU controller 702 uses the temperature setpoints to generate the control signals for powered RTU components 902. The control signals may include on/off commands, speed setpoints for fan 838 and compressor 874, position setpoints for fuel valve 852, or other operating commands for individual devices of powered RTU components 902. In other embodiments, the control signals may include the temperature setpoints (e.g., a zone temperature setpoint $T_{sp,zone}$, a supply air temperature setpoint $T_{sp,sa}$, etc.) generated by predictive RTU controller 702. The temperature setpoints can be provided to powered RTU components 902 or local controllers for powered RTU components 902 which operate to achieve the temperature setpoints. For example, a local controller for fan 838 may receive a measurement of the supply air temperature $T_{sa}$ from supply air temperature sensor 862 and/or a measurement the zone temperature $T_{zone}$ from zone temperature sensor 864. The local controller can use a feedback control process (e.g., PID, ESC, MPC, etc.) to adjust the speed of fan 838 to drive the measured temperature(s) to the temperature setpoint(s). Similar feedback control processes can be used to control compressor 874 and fuel valve 852. The multi-stage optimization performed by predictive RTU controller 702 is described in greater detail with reference to FIG. 10.

Predictive RTU Controller

Figure 10:
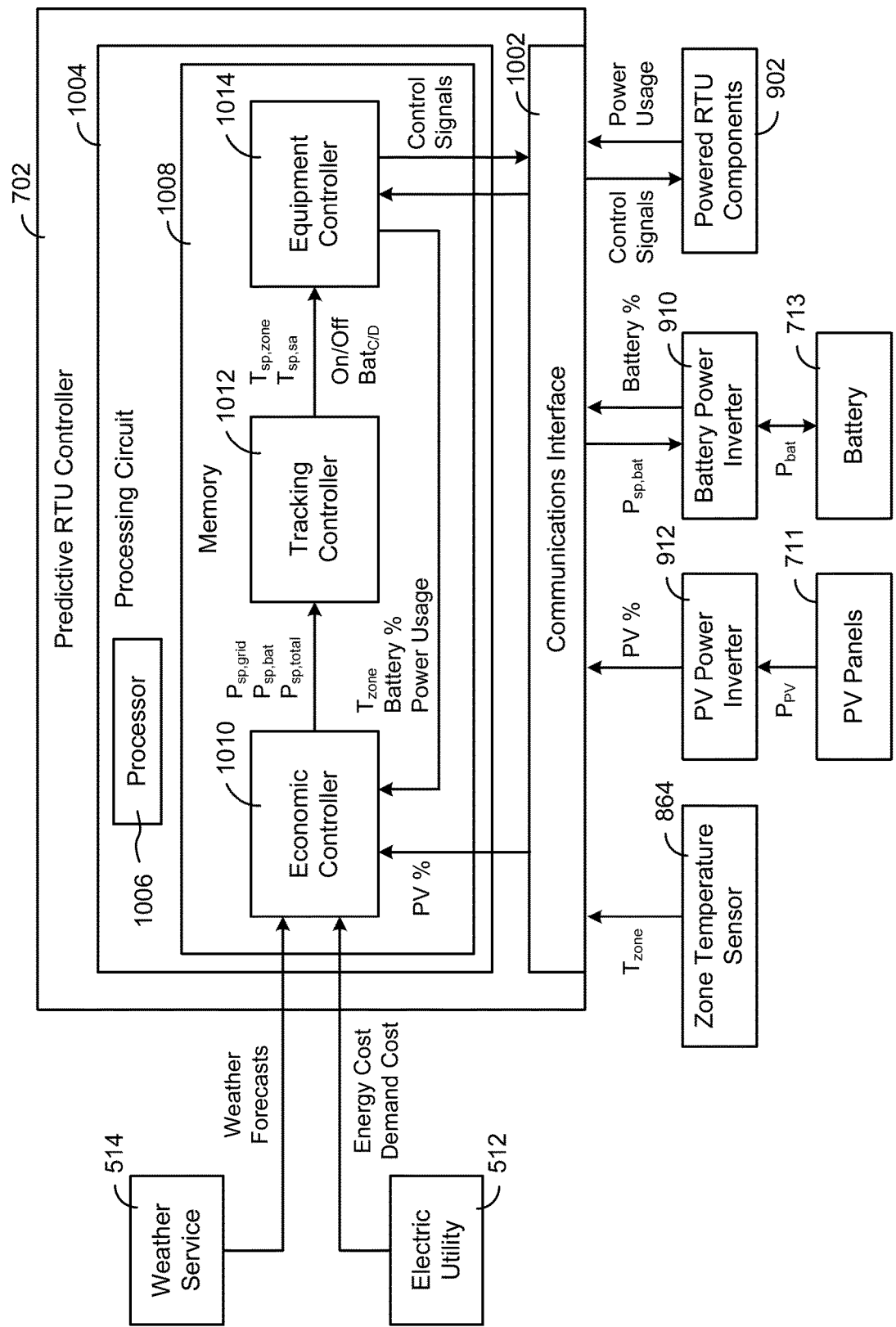
FIG. 10 is a block diagram illustrating a predictive RTU controller which can be used to monitor and control the RTU of FIG. 7, according to an exemplary embodiment.

Referring now to FIG. 10, a block diagram illustrating predictive RTU controller 702 in greater detail is shown, according to an exemplary embodiment. Predictive RTU controller 702 is shown to include a communications interface 1002 and a processing circuit 1004. Communications interface 1002 may facilitate communications between controller 702 and external systems or devices. For example, communications interface 1002 may receive measurements of the zone temperature $T_{zone}$ from zone temperature sensor 864 and measurements of the power usage of powered RTU components 902. In some embodiments, communications interface 1002 receives measurements of the state-of-charge (SOC) of battery 713, which can be provided as a percentage of the maximum battery capacity (i.e., battery %). In some embodiments, communications interface 1002 receives measurements of the amount of power $P_{PV}$ generated by PV panels 711, which can be provided as a percentage of the maximum PV capacity (i.e., PV %). Communications interface 1002 can receive weather forecasts from a weather service 514 and predicted energy costs and demand costs from an electric utility 512. In some embodiments, predictive RTU controller 702 uses communications interface 1002 to provide control signals powered RTU components 902 and power inverters 910-912.

Communications interface 1002 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 1002 can include an Ethernet card and port for sending and receiving data via an Ethernet-based communications link or network. In another example, communications interface 1002 can include a WiFi transceiver for communicating via a wireless communications network or cellular or mobile phone communications transceivers.

Processing circuit 1004 is shown to include a processor 1006 and memory 1008. Processor 1006 may be a general purpose or specific purpose processor, an application specific integrated circuit (ASIC), one or more field programmable gate arrays (FPGAs), a group of processing components, or other suitable processing components. Processor 1006 is configured to execute computer code or instructions stored in memory 1008 or received from other computer readable media (e.g., CDROM, network storage, a remote server, etc.).

Memory 1008 may include one or more devices (e.g., memory units, memory devices, storage devices, etc.) for storing data and/or computer code for completing and/or facilitating the various processes described in the present disclosure. Memory 1008 may include random access memory (RAM), read-only memory (ROM), hard drive storage, temporary storage, non-volatile memory, flash memory, optical memory, or any other suitable memory for storing software objects and/or computer instructions. Memory 1008 may include database components, object code components, script components, or any other type of information structure for supporting the various activities and information structures described in the present disclosure. Memory 1008 may be communicably connected to processor 1006 via processing circuit 1004 and may include computer code for executing (e.g., by processor 1006) one or more processes described herein. When processor 1006 executes instructions stored in memory 1008 for completing the various activities described herein, processor 1006 generally configures controller 702 (and more particularly processing circuit 1004) to complete such activities.

Still referring to FIG. 10, predictive RTU controller 702 is shown to include an economic controller 1010, a tracking controller 1012, and an equipment controller 1014. Controllers 610-614 can be configured to perform a multi-state optimization process to generate control signals for power inverters 910-912 and powered RTU components 902. In brief overview, economic controller 1010 can optimize a predictive cost function to determine an optimal amount of power to purchase from energy grid 508 (i.e., a grid power setpoint $P_{sp,grid}$), an optimal amount of power to store or discharge from battery 713 (i.e., a battery power setpoint $P_{sp,bat}$), and/or an optimal amount of power to be consumed by powered RTU components 902 (i.e., an RTU power setpoint $P_{sp,total}$) at each time step of an optimization period. Tracking controller 1012 can use the optimal power setpoints $P_{sp,grid}$, $P_{sp,bat}$, and/or $P_{sp,total}$ to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). Equipment controller 1014 can use the optimal temperature setpoints $T_{sp,zone}$ or $T_{sp,sa}$ to generate control signals for powered RTU components 902 that drive the actual (e.g., measured) temperatures $T_{zone}$ and/or $T_{sa}$ to the setpoints (e.g., using a feedback control technique). Each of controllers 1010-1014 is described in detail below.

Economic Controller

Economic controller 1010 can be configured to optimize a predictive cost function to determine an optimal amount of power to purchase from energy grid 508 (i.e., a grid power setpoint $P_{sp,grid}$), an optimal amount of power to store or discharge from battery 713 (i.e., a battery power setpoint $P_{sp,bat}$), and/or an optimal amount of power to be consumed by powered RTU components 902 (i.e., an RTU power setpoint $P_{sp,total}$) at each time step of an optimization period. An example of a predictive cost function which can be optimized by economic controller 1010 is shown in the following equation:

$$\min(J) = \sum_{k=1}^{h} C_{ec}(k)P_{comp}(k)\Delta t + \sum_{k=1}^{h} C_{ec}(k)P_{fan}(k)\Delta t + \sum_{k=1}^{h} C_{gas}(k)F_{gas}(k)\Delta t + C_{DC}\max_{k}(P_{grid}(k)) - \sum_{k=1}^{h} C_{ec}(k)P_{bat}(k)\Delta t$$

where $C_{ec}(k)$ is the cost per unit of electricity (e.g., \$/kWh) purchased from electric utility 512 during time step k, $P_{comp}(k)$ is the power consumption (e.g., kW) of compressor 874 during time step k, $P_{fan}(k)$ is the power consumption (e.g., kW) of fan 838 during time step k, $C_{gas}(k)$ is the cost per unit of gas (e.g., \$/liter) consumed by RTU 700 at time step k, $F_{gas}(k)$ is the flow rate of the gas provided to RTU 700 by the heated fluid (e.g., liter/s) at time step k, $C_{DC}$ is the demand charge rate (e.g., \$/kW), the max( ) term selects the maximum power consumption of RTU 700 (i.e., the maximum value of $P_{grid}(k)$) during any time step k of the optimization period, $P_{bat}(k)$ is the amount of power discharged from battery 713 during time step k, and $\Delta t$ is the duration of each time step k. Economic controller 1010 can optimize the predictive cost function J over the duration of the optimization period (e.g., from time step k=1 to time step k=h) to predict the total cost of operating RTU 700 over the duration of the optimization period.

The first and second terms of the predictive cost function J represent the cost of electricity consumed by powered RTU components 902 over the duration of the optimization period. The values of the parameter $C_{ec}(k)$ at each time step k can be defined by the energy cost information provided by electric utility 512. In some embodiments, the cost of electricity varies as a function of time, which results in different values of $C_{ec}(k)$ at different time steps k. In some embodiments, the total power consumption $P_{total}(k)$ of powered RTU components 902 at time step k is a sum of the compressor power consumption $P_{comp}(k)$ and the fan power consumption $P_{fan}(k)$ (i.e., $P_{total}(k)=P_{fan}(k)+P_{comp}(k)$). The variables $P_{comp}(k)$ and $P_{fan}(k)$ are decision variables which can be optimized by economic controller 1010.

The third term of the predictive cost function J represents the cost of the fuel (e.g., natural gas) consumed by RTU 700 over the duration of the optimization period. The values of $C_{gas}(k)$ at each time step k can be defined by the energy cost information provided by electric utility 512. In some embodiments, the cost of gas varies as a function of time, which results in different values of $C_{gas}(k)$ at different time steps k. The variable $F_{gas}(k)$ is a decision variable which can be optimized by economic controller 1010.

The fourth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., \$/kW) and may be multiplied by the peak power usage (e.g., kW) during a demand charge period to calculate the demand charge. In the predictive cost function J, the demand charge rate $C_{DC}$ may be defined by the demand cost information received from electric utility 512. The variable $P_{grid}(k)$ is a decision variable which can be optimized by economic controller 1010 in order to reduce the peak power usage $\max(P_{grid}(k))$ that occurs during the demand charge period. Load shifting may allow economic controller 1010 to smooth momentary spikes in the electric demand of RTU 700 by storing energy in battery 713 when the power consumption of powered RTU components 902 is low. The stored energy can be discharged from battery 713 when the power consumption of powered RTU components 902 is high in order to reduce the peak power draw $P_{grid}$ from energy grid 508, thereby decreasing the demand charge incurred.

The final term of the predictive cost function J represents the cost savings resulting from the use of battery 713. Unlike the previous terms in the cost function J, the final term subtracts from the total cost. The values of the parameter $C_{ec}(k)$ at each time step k can be defined by the energy cost information provided by electric utility 512. In some embodiments, the cost of electricity varies as a function of time, which results in different values of $C_{ec}(k)$ at different time steps k. The variable $P_{bat}(k)$ is a decision variable which can be optimized by economic controller 1010. A positive value of $P_{bat}(k)$ indicates that battery 713 is discharging, whereas a negative value of $P_{bat}(k)$ indicates that battery 713 is charging. The power discharged from battery 713 $P_{bat}(k)$ can be used to satisfy some or all of the total power consumption $P_{total}(k)$ of powered RTU components 902, which reduces the amount of power $P_{grid}(k)$ purchased from energy grid 508 (i.e., $P_{grid}(k)=P_{total}(k)-P_{bat}(k)-P_{PV}(k)$). However, charging battery 713 results in a negative value of $P_{bat}(k)$ which adds to the total amount of power $P_{grid}(k)$ purchased from energy grid 508.

In some embodiments, the power $P_{PV}$ provided by PV panels 711 is not included in the predictive cost function J because generating PV power does not incur a cost. However, the power $P_{PV}$ generated by PV panels 711 can be used to satisfy some or all of the total power consumption $P_{total}(k)$ of powered RTU components 902, which reduces the amount of power $P_{grid}(k)$ purchased from energy grid 508 (i.e., $P_{grid}(k)=P_{total}(k)-P_{bat}(k)-P_{PV}(k)$). The amount of PV power $P_{PV}$ generated during any time step k can be predicted by economic controller 1010. Several techniques for predicting the amount of PV power generated by PV panels are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 1010 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 1010 can use battery 713 to perform load shifting by drawing electricity from energy grid 508 when energy prices are low and/or when the power consumed by powered RTU components 902 is low. The electricity can be stored in battery 713 and discharged later when energy prices are high and/or the power consumption of powered RTU components 902 is high. This enables economic controller 1010 to reduce the cost of electricity consumed by RTU 700 and can smooth momentary spikes in the electric demand of RTU 700, thereby reducing the demand charge incurred.

Economic controller 1010 can be configured to impose constraints on the optimization of the predictive cost function J. In some embodiments, the constraints include constraints on the temperature $T_{zone}$ of the building zone 806. Economic controller 1010 can be configured to maintain the actual or predicted temperature $T_{zone}$ between an minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, economic controller 1010 can model the temperature $T_{zone}$ of the building zone 806 as a function of the decision variables optimized by economic controller 1010. In some embodiments, economic controller 1010 models the temperature of the building zone using a heat transfer model. For example, the dynamics of heating or cooling the building zone can be described by the energy balance:

$$C\frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature), $\dot{Q}_{HVAC}$ is the amount of heating applied to the building zone by RTU 700, and $\dot{Q}_{other}$ is the external load, radiation, or other disturbance experienced by the building zone. In the previous equation, $\dot{Q}_{HVAC}$ represents heat transfer into the building zone by RTU 700 (i.e., the heating load) and therefore has a positive sign. However, if cooling is applied to the building zone rather than heating, the sign on $\dot{Q}_{HVAC}$ can be switched to a negative sign such that $\dot{Q}_{HVAC}$ represents the amount of cooling applied to the building zone by RTU 700 (i.e., the cooling load).

In some embodiments, the amount of heating or cooling $\dot{Q}_{HVAC}$ provided by RTU 700 can be defined as a function of the decision variables $P_{comp}$, $P_{fan}$, $F_{gas}$, and $P_{bat}$. Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 1010 include the following air and mass zone models:

$$C_z\frac{dT_{zone}}{dt} = H_{az}(T_a - T_{zone}) + H_{mz}(T_m - T_{zone}) + \dot{Q}_{HVAC} + \dot{Q}_{other}$$

$$C_m\frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 1010 include the following air, shallow mass, and deep mass zone models:

$$C_z\frac{dT_{zone}}{dt} = H_{az}(T_a - T_{zone}) + H_{sz}(T_s - T_{zone}) + \dot{Q}_{HVAC} + \dot{Q}_{other}$$

$$C_s\frac{dT_s}{dt} = H_{sz}(T_{zone} - T_s) + H_{ds}(T_d - T_s)$$

$$C_d\frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, economic controller 1010 uses the weather forecasts from weather service 514 to determine appropriate values for the ambient air temperature $T_a$ and/or the external disturbance $\dot{Q}_{other}$ at each time step of the optimization period. Values of C and H can be specified as parameters of the building zone, received from tracking controller 1012, received from a user, retrieved from memory 1008, or otherwise provided as an input to economic controller 1010. Accordingly, the temperature of the building zone $T_{zone}$ can be defined as a function of the amount of heating or cooling $\dot{Q}_{HVAC}$ applied to the building zone by RTU 700 using any of these heat transfer models. The manipulated variable $\dot{Q}_{HVAC}$ can be adjusted by economic controller 1010 by adjusting the variables $P_{fan}$, $P_{comp}$, and $F_{gas}$ in the predictive cost function J.

In some embodiments, economic controller 1010 uses a model that defines the amount of heating or cooling $\dot{Q}_{HVAC}$ applied to the building zone by RTU 700 as a function of the power setpoints $P_{sp,grid}$ and $P_{sp,bat}$ provided by economic controller 1010. For example, economic controller 1010 can add the power setpoints $P_{sp,grid}$ and $P_{sp,bat}$ to determine the total amount of power $P_{total}$ that will be consumed by powered RTU components 902. In some embodiments, $P_{total}$ is equivalent to the combined power consumption of fan 838 and compressor 874 (i.e., $P_{total} = P_{fan} + P_{comp}$) and can be used by economic controller 1010 to determine the amount of cooling provided to supply air 710 by RTU 700. Similarly, $F_{gas}$ can be used to determine the amount of heating provided to supply air 710 by RTU 700. Economic controller 1010 can use $P_{total}$ in combination with $F_{gas}$ to determine the total amount of heating or cooling $\dot{Q}_{HVAC}$ applied to the building zone by RTU 700.

In some embodiments, economic controller 1010 uses one or more models that define the amount of heating or cooling applied to the building zone by RTU 700 (i.e., $\dot{Q}_{HVAC}$) as a function of the zone temperature $T_{zone}$ and the zone temperature setpoint $T_{sp,zone}$ as shown in the following equation:

$$\dot{Q}_{HVAC} = f(T_{zone}, T_{sp,zone})$$

The models used by economic controller 1010 can be imposed as optimization constraints to ensure that the amount of heating or cooling $\dot{Q}_{HVAC}$ provided by RTU 700 is not reduced to a value that would cause the zone temperature $T_{zone}$ to deviate from an acceptable or comfortable temperature range.

In some embodiments, economic controller 1010 relates the amount of heating or cooling $\dot{Q}_{HVAC}$ provided by RTU 700 to the zone temperature $T_{zone}$ and the zone temperature setpoint $T_{sp,zone}$ using multiple models. For example, economic controller 1010 can use a model of equipment controller 1014 to determine the control action performed by equipment controller 1014 as a function of the zone temperature $T_{zone}$ and the zone temperature setpoint $T_{sp,zone}$. An example of such a zone regulatory controller model is shown in the following equation:

$$v_{air} = f_1(T_{zone}, T_{sp,zone})$$

where $v_{air}$ is the rate of airflow to the building zone (i.e., the control action). In some embodiments, $v_{air}$ depends on the speed of fan 838 in RTU 700 and may be a function of $P_{total}$. Economic controller 1010 can use an equipment model or manufacturer specifications for fan 838 to define $v_{air}$ as a function of $P_{total}$. The function $f_1$ can be identified from data. For example, economic controller 1010 can collect measurements of $v_{air}$ and $T_{zone}$ and identify the corresponding value of $T_{sp,zone}$. Economic controller 1010 can perform a system identification process using the collected values of $v_{air}$, $T_{zone}$, and $T_{sp,zone}$ as training data to determine the function $f_1$ that defines the relationship between such variables.

Economic controller 1010 can use an energy balance model relating the control action $v_{air}$ to the amount of heating or cooling $\dot{Q}_{HVAC}$ provided by RTU 700 as shown in the following equation:

$$\dot{Q}_{HVAC} = f_2(v_{air})$$

where the function $f_2$ can be identified from training data. Economic controller 1010 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided by RTU 700 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c\left[\varepsilon + \frac{1}{\tau_I}\int_0^t \varepsilon(t')dt'\right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_I$ is the zone PI controller integral time, and $\varepsilon$ is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 1014 and heat transfer in RTU 700, a nonlinear heating/cooling duty model can be used instead.

In addition to constraints on the zone temperature $T_{zone}$, economic controller 1010 can impose constraints on the state-of-charge (SOC) and charge/discharge rates of battery 713. In some embodiments, economic controller 1010 generates and imposes the following power constraints on the predictive cost function J:

$$P_{bat} \leq P_{rated}$$

$$-P_{bat} \leq P_{rated}$$

where $P_{bat}$ is the amount of power discharged from battery 713 and $P_{rated}$ is the rated battery power of battery 713 (e.g., the maximum rate at which battery 713 can be charged or discharged). These power constraints ensure that battery 713 is not charged or discharged at a rate that exceeds the maximum possible battery charge/discharge rate $P_{rated}$.

In some embodiments, economic controller 1010 generates and imposes one or more capacity constraints on the predictive cost function J The capacity constraints may be used to relate the battery power $P_{bat}$ charged or discharged during each time step to the capacity and SOC of battery 713. The capacity constraints may ensure that the capacity of battery 713 is maintained within acceptable lower and upper bounds at each time step of the optimization period. In some embodiments, economic controller 1010 generates the following capacity constraints:

$$C_a(k) - P_{bat}(k)\Delta t \leq C_{rated}$$

$$C_a(k) - P_{bat}(k)\Delta t \geq 0$$

where $C_a(k)$ is the available battery capacity (e.g., kWh) at the beginning of time step k, $P_{bat}(k)$ is the rate at which battery 713 is discharged during time step k (e.g., kW), $\Delta t$ is the duration of each time step, and $C_{rated}$ is the maximum rated capacity of battery 713 (e.g., kWh). The term $P_{bat}(k)\Delta t$ represents the change in battery capacity during time step k. These capacity constraints ensure that the capacity of battery 713 is maintained between zero and the maximum rated capacity $C_{rated}$.

In some embodiments, economic controller 1010 generates and imposes one or more capacity constraints on the operation of powered RTU components 902. For example, fan 838 may have a maximum operating speed which corresponds to a maximum power consumption $P_{fan,max}$ by fan 838. Similarly, compressor 874 may have a maximum operating speed which corresponds to a maximum power consumption $P_{comp,max}$ by compressor 874. Economic controller 1010 can be configured to generate constraints which limit the power consumption of fan 838 and compressor 874 between zero and the maximum values, as shown in the following equations:

$$0 \leq P_{fan} \leq P_{fan,max}$$

$$0 \leq P_{comp} \leq P_{comp,max}$$

Economic controller 1010 may also establish constraints that define the total power consumption of powered RTU components 902, as shown in the following equations:

$$P_{total} = P_{fan} + P_{comp}$$

$$P_{total} = P_{sp,grid} + P_{sp,bat} + P_{PV}$$

where the total power $P_{total}$ provided to powered RTU components 902 is the sum of the grid power setpoint $P_{sp,grid}$, the battery power setpoint $P_{sp,bat}$, and the PV power $P_{PV}$. The total power consumption $P_{total}$ of RTU components 902 is also a sum of the fan power consumption $P_{fan}$ and the compressor power consumption $P_{comp}$.

In some embodiments, economic controller 1010 generates and imposes one or more capacity constraints on the operation of refrigeration circuit 870. For example, the operation of refrigeration circuit 870 may be defined by an equipment performance curve for refrigeration circuit 870. The equipment performance curve may define the amount of cooling provided by refrigeration circuit 870 as a function of the electricity consumed by refrigeration circuit 870. Economic controller 1010 can generate and impose a constraint that limits the operation of refrigeration circuit 870 to a point on the equipment performance curve. Several examples of equipment performance curves which can be used by economic controller 1010 are described in greater detail in U.S. patent application Ser. No. 14/634,609 filed Feb. 27, 2015.

In some embodiments, economic controller 1010 can generate and impose a constraint that limits the flow rate of the gas to burner 850 between zero and a maximum flow rate $F_{gas,max}$. An example of such a constraint is shown in the following equation:

$$0 \leq F_{gas} \leq F_{gas,max}$$

Economic controller 1010 can optimize the predictive cost function J subject to the constraints to determine optimal values for the decision variables $P_{fan}$, $P_{comp}$, $F_{gas}$, $P_{grid}$, and $P_{bat}$, where $P_{total} = P_{bat} + P_{grid} + P_{PV}$. In some embodiments, economic controller 1010 uses the optimal values for $P_{total}$, $P_{bat}$, and/or $P_{grid}$ to generate power setpoints for tracking controller 1012. The power setpoints can include battery power setpoints $P_{sp,bat}$, grid power setpoints $P_{sp,grid}$, and/or RTU power setpoints $P_{sp,total}$ for each of the time steps k in the optimization period. Economic controller 1010 can provide the power setpoints to tracking controller 1012.

Tracking Controller

Tracking controller 1012 can use the optimal power setpoints $P_{sp,grid}$, $P_{sp,bat}$, and/or $P_{sp,total}$ generated by economic controller 1010 to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). In some embodiments, tracking controller 1012 generates a zone temperature setpoint $T_{sp,zone}$ and/or a supply air temperature setpoint $T_{sp,sa}$ that are predicted to achieve the power setpoint $P_{sp,total}$ for RTU 700. In other words, tracking controller 1012 may generate a zone temperature setpoint $T_{sp,zone}$ and/or a supply air temperature setpoint $T_{sp,sa}$ that cause RTU 700 to consume the optimal amount of power $P_{total}$ determined by economic controller 1010.

In some embodiments, tracking controller 1012 relates the power consumption of RTU 700 to the zone temperature $T_{zone}$ and the zone temperature setpoint $T_{sp,zone}$ using a power consumption model. For example, tracking controller 1012 can use a model of equipment controller 1014 to determine the control action performed by equipment controller 1014 as a function of the zone temperature $T_{zone}$ and the zone temperature setpoint $T_{sp,zone}$. An example of such a zone regulatory controller model is shown in the following equation:

$$v_{air} = f_3(T_{zone}, T_{sp,zone})$$

where $v_{air}$ is the rate of airflow to the building zone (i.e., the control action).

In some embodiments, $v_{air}$ depends on the speed of fan 838 in RTU 700 and may be a function of $P_{total}$. Tracking controller 1012 can use an equipment model or manufacturer specifications for fan 838 to translate $v_{air}$ into a corresponding power consumption value $P_{total}$. Accordingly, tracking controller 1012 can define the power consumption $P_{total}$ of RTU 700 as a function of the zone temperature $T_{zone}$ and the zone temperature setpoint $T_{sp,zone}$. An example of such a model is shown in the following equation:

$$P_{total} = f_4(T_{zone}, T_{sp,zone})$$

The function $f_4$ can be identified from data. For example, tracking controller 1012 can collect measurements of $P_{total}$ and $T_{zone}$ and identify the corresponding value of $T_{sp,zone}$. Tracking controller 1012 can perform a system identification process using the collected values of $P_{total}$, $T_{zone}$, and $T_{sp,zone}$ as training data to determine the function $f_4$ that defines the relationship between such variables.

Tracking controller 1012 may use a similar model to determine the relationship between the total power consumption $P_{total}$ of RTU 700 and the supply air temperature setpoint $T_{sp,sa}$. For example, tracking controller 1012 can define the power consumption $P_{total}$ of RTU 700 as a function of the zone temperature $T_{zone}$ and the supply air temperature setpoint $T_{sp,zone}$. An example of such a model is shown in the following equation:

$$P_{total} = f_5(T_{zone}, T_{sp,sa})$$

The function $f_5$ can be identified from data. For example, tracking controller 1012 can collect measurements of $P_{total}$ and $T_{zone}$ and identify the corresponding value of $T_{sp,sa}$. Tracking controller 1012 can perform a system identification process using the collected values of $P_{total}$, $T_{zone}$, and $T_{sp,sa}$ as training data to determine the function $f_5$ that defines the relationship between such variables.

Tracking controller 1012 can use the relationships between $P_{total}$, $T_{sp,zone}$, and $T_{sp,sa}$ to determine values for $T_{sp,zone}$ and $T_{sp,sa}$. For example, tracking controller 1012 can receive the value of $P_{total}$ as an input from economic controller 1010 (i.e., $P_{sp,total}$) and can use determine corresponding values of $T_{sp,zone}$ and $T_{sp,sa}$. Tracking controller 1012 can provide the values of $T_{sp,zone}$ and $T_{sp,sa}$ as outputs to equipment controller 1014.

In some embodiments, tracking controller 1012 uses the battery power setpoint $P_{sp,bat}$ to determine the optimal rate $Bat_{C/D}$ at which to charge or discharge battery 713. For example, the battery power setpoint $P_{sp,bat}$ may define a power value (kW) which can be translated by tracking controller 1012 into a control signal for power inverter 910 and/or equipment controller 1014. In other embodiments, the battery power setpoint $P_{sp,bat}$ is provided directly to power inverter 910 and used by power inverter 910 to control the battery power $P_{bat}$.

Equipment Controller

Equipment controller 1014 can use the optimal temperature setpoints $T_{sp,zone}$ or $T_{sp,sa}$ generated by tracking controller 1012 to generate control signals for powered RTU components 902. The control signals generated by equipment controller 1014 may drive the actual (e.g., measured) temperatures $T_{zone}$ and/or $T_{sa}$ to the setpoints. Equipment controller 1014 can use any of a variety of control techniques to generate control signals for powered RTU components 902. For example, equipment controller 1014 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for powered RTU components 902.

The control signals may include on/off commands, speed setpoints for fan 838, position setpoints for actuators 504 and valves 506, or other operating commands for individual devices of powered RTU components 902. In some embodiments, equipment controller 1014 uses a feedback control technique (e.g., PID, ESC, MPC, etc.) to adjust the speed of fan 838 and/or compressor 874 to adjust the amount of cooling applied to supply air 710 to drive the measured temperatures $T_{zone}$ and/or $T_{sa}$ to the temperature setpoints $T_{sp,zone}$ and/or $T_{sp,sa}$. Similarly, equipment controller 1014 can use a feedback control technique to control the position of fuel valve 852 to adjust the amount of heating applied to supply air 710 to drive the measured temperatures $T_{zone}$ and/or $T_{sa}$ to the temperature setpoints $T_{sp,zone}$ and/or $T_{sp,sa}$. Equipment controller 1014 can provide the control signals to powered RTU components 902 to control the operation of powered RTU components 902, thereby causing powered RTU components 902 to affect the zone temperature $T_{zone}$ and/or the supply air temperature $T_{sa}$.

In some embodiments, equipment controller 1014 is configured to provide control signals to power inverter 910. The control signals provided to power inverter 910 can include a battery power setpoint $P_{sp,bat}$ and/or the optimal charge/discharge rate $Bat_{C/D}$. Equipment controller 1014 can be configured to operate power inverter 910 to achieve the battery power setpoint $P_{sp,bat}$. For example, equipment controller 1014 can cause power inverter 910 to charge battery 713 or discharge battery 713 in accordance with the battery power setpoint $P_{sp,bat}$.

AHU Control Process

Figures 11, 12:
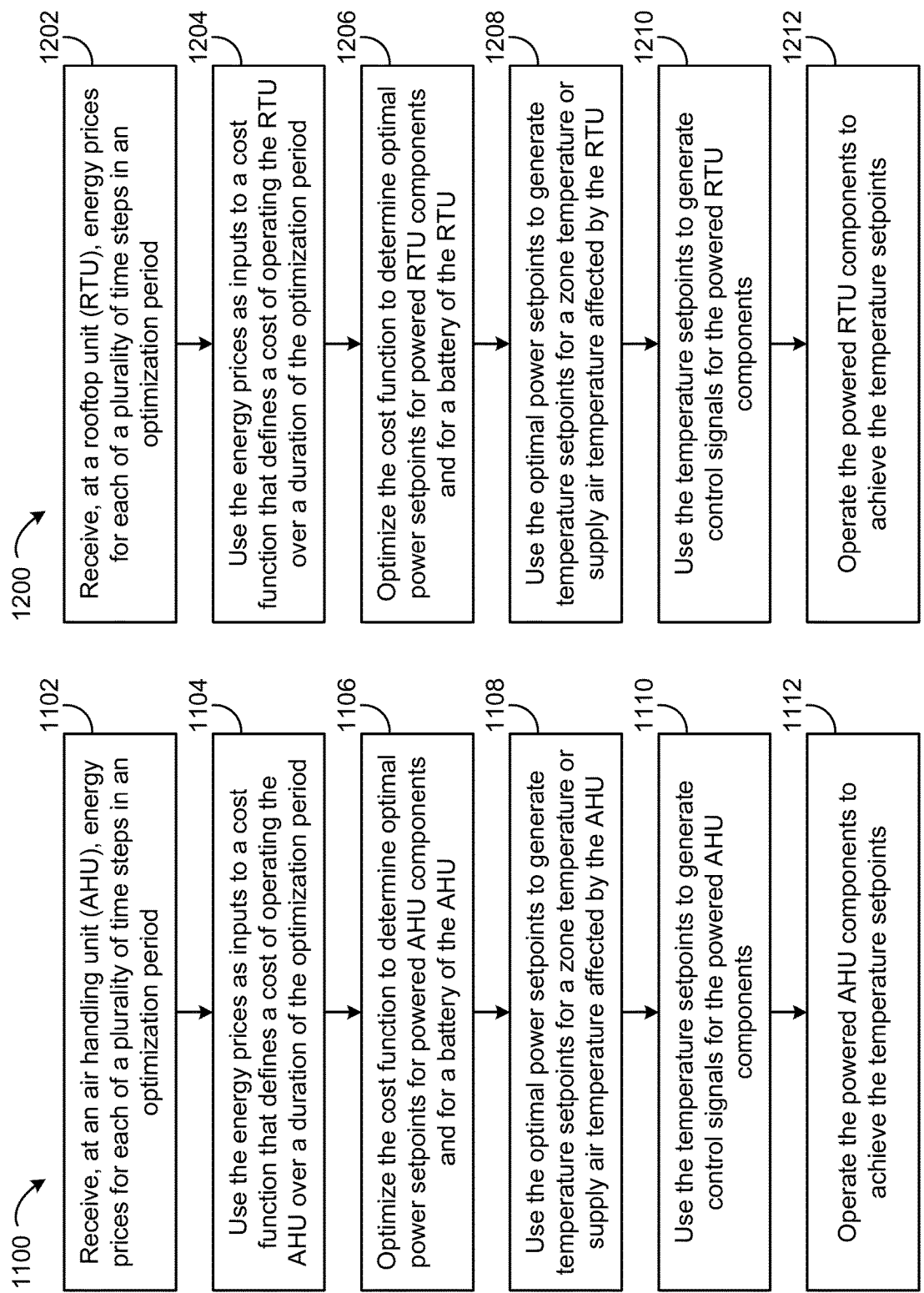
FIG. 11 is a flowchart of a process for operating the AHU of FIG. 2, according to an exemplary embodiment.
FIG. 12 is a flowchart of a process for operating the RTU of FIG. 7, according to an exemplary embodiment.

Referring now to FIG. 11, a flowchart of a process 1100 for operating an air handling unit (AHU) is shown, according to an exemplary embodiment. In some embodiments, process 1100 is performed by one or more components AHU 200, as described with reference to FIGS. 2-6. For example, process 1100 can be performed by predictive AHU controller 202.

Process 1100 is shown to include receiving, at an AHU, energy prices for each of a plurality of time steps in an optimization period (step 1102). In some embodiments, the energy prices are time-varying energy prices which may have different values for different time steps of the optimization period. The energy prices can include a cost per unit of electricity $C_{ec}$ (e.g., $/kWh) and/or a demand cost $C_{DC}$ (e.g., $/kW of maximum power consumption). In some embodiments, the energy prices include a cost per unit of cooling energy $C_{cold}$ and/or a cost per unit of heating energy $C_{hot}$ supplied to the AHU. For example, the cost per unit of cooling energy $C_{cold}$ can include a cost incurred to generate a unit of a chilled fluid supplied to the AHU. Similarly, the cost per unit of heating energy $C_{hot}$ can include a cost incurred to generate a unit of a heated fluid supplied to the AHU. In some embodiments, the costs per unit of cooling energy $C_{cold}$ and heating energy $C_{hot}$ are determined by the AHU using subplant curves for subplants that generate the heated and chilled fluids, as described with reference to FIG. 6.

Process 1100 is shown to include using the energy prices as inputs to a cost function that defines a cost of operating the AHU over a duration of the optimization period (step 1104). An example of a cost function which can be used in step 1104 is shown in the following equation:

$$\min(J) = \sum_{k=1}^{h} C_{ec}(k)P_{total}(k)\Delta t + \sum_{k=1}^{h} C_{cold}(k)F_{cold}(k)\Delta t +$$
$$\sum_{k=1}^{h} C_{hot}(k)F_{hot}(k)\Delta t + C_{DC} \max_{k}(P_{grid}(k)) - \sum_{k=1}^{h} C_{ec}(k)P_{bat}(k)\Delta t$$

where $C_{ec}(k)$ is the cost per unit of electricity (e.g., $/kWh) purchased from electric utility 512 during time step k, $P_{total}(k)$ is the total power consumption (e.g., kW) of powered AHU components 502 during time step k, $C_{cold}(k)$ is the cost per unit of cooling (e.g., $/ton-hour) needed to generate the chilled fluid supplied to AHU 200 at time step k, $F_{cold}(k)$ is the rate at which cooling is provided to AHU 200 by the chilled fluid (e.g., ton) at time step k, $C_{hot}(k)$ is the cost per unit of heating (e.g., $/kWh) needed to generate the heated fluid supplied to AHU 200 at time step k, $F_{hot}(k)$ is the rate at which heating is provided to AHU 200 by the heated fluid (e.g., kW) at time step k, $C_{DC}$ is the demand charge rate (e.g., $/kW), the max( ) term selects the maximum power consumption of AHU 200 (i.e., the maximum value of $P_{grid}(k)$) during any time step k of the optimization period, $P_{bat}(k)$ is the amount of power discharged from battery 213 during time step k, and $\Delta t$ is the duration of each time step k.

Process 1100 is shown to include optimizing the cost function to determine optimal power setpoints for powered AHU components and for a battery of the AHU (step 1106). Step 1106 can be performed by economic controller 610. In some embodiments, the cost function is optimized subject to a set of optimization constraints. The optimization constraints can include constraints on the zone temperature $T_{zone}$, constraints on the battery power $P_{bat}$, constraints on the state-of-charge of the battery, constraints on the operational domain of the waterside equipment used to generate the heated or chilled fluid, constraints on the operational domain of the powered AHU components, and/or any other constraints which can be used to limit the optimization to a feasible solution. Examples of such constraints are described in detail with reference to FIG. 6.

The optimal power setpoints generated in step 1106 can include an optimal amount of power to purchase from an energy grid (i.e., a grid power setpoint $P_{sp,grid}$), an optimal amount of power to store or discharge from the battery (i.e., a battery power setpoint $P_{sp,bat}$), and/or an optimal amount of power to be consumed by the powered AHU components (i.e., an AHU power setpoint $P_{sp,total}$) at each time step of an optimization period. In some embodiments, these power setpoints are decision variables in the cost function. In other embodiments, one or more of the power setpoints can be calculated based on the values of the decision variables. For example, the power setpoint $P_{sp,total}$ can be calculated by summing $P_{sp,grid}$ and $P_{sp,bat}$. In some embodiments, step 1106 includes determining an optimal fan power setpoint $P_{sp,fan}$. The optimal fan power setpoint may be equivalent to the amount of power to be consumed by the powered AHU components (e.g., $P_{sp,fan} = P_{sp,total}$).

Process 1100 is shown to include using the optimal power setpoints to generate temperature setpoints for a zone temperature or supply air temperature affected by the AHU (step 1108). In some embodiments, step 1108 is performed by tracking controller 612. Step 1108 can include using the optimal power setpoints $P_{sp,grid}$, $P_{sp,bat}$, and/or $P_{sp,total}$ generated in step 1106 to determine a zone temperature setpoint $T_{sp,zone}$ and/or a supply air temperature setpoint $T_{sp,sa}$. In some embodiments, step 1108 includes generating a zone temperature setpoint $T_{sp,zone}$ and/or a supply air temperature setpoint $T_{sp,sa}$ that are predicted to achieve the power setpoint $P_{sp,total}$ for the AHU. In other words, step 1108 may include generating a zone temperature setpoint $T_{sp,zone}$ and/or a supply air temperature setpoint $T_{sp,sa}$ that cause the AHU to consume the optimal amount of power $P_{total}$ determined in step 1106. An example of how the temperature setpoints can be generated based on the power setpoints is described in detail with reference to FIG. 6.

Process 1100 is shown to include using the temperature setpoints to generate control signals for the powered AHU components (step 1110). In some embodiments, step 1110 is performed by equipment controller 614. The control signals generated in step 1110 may drive the actual (e.g., measured) temperatures $T_{zone}$ and/or $T_{sa}$ to the setpoints. Step 1110 can include using any of a variety of control techniques to generate control signals for the powered AHU components. For example, step 1110 can include using state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for the powered AHU components.

The control signals may include on/off commands, speed setpoints for fan 338, position setpoints for actuators 504 and valves 506, or other operating commands for individual devices of powered the AHU components. In some embodiments, step 1110 includes using a feedback control technique (e.g., PID, ESC, MPC, etc.) to adjust the speed of fan 338 to drive the measured temperatures $T_{zone}$ and/or $T_{sa}$ to the temperature setpoints $T_{sp,zone}$ and/or $T_{sp,sa}$. Similarly, step 1110 can include using a feedback control technique to control the positions of actuators 504 and/or valves 506 to adjust the amount of heating or cooling applied to supply air 210 to drive the measured temperatures $T_{zone}$ and/or $T_{sa}$ to the temperature setpoints $T_{sp,zone}$ and/or $T_{sp,sa}$. In some embodiments, step 1110 includes generating control signals for a battery power inverter. The control signals for the battery power inverter can include a battery power setpoint $P_{sp,bat}$ and/or the optimal charge/discharge rate $Bat_{C/D}$.

Process 1100 is shown to include operating the powered AHU components to achieve the temperature setpoints (step 1112). In some embodiments, step 1112 includes providing the control signals generated in step 1110 to the powered AHU components. The control signals may control the operation of the powered AHU components, thereby causing the powered AHU components to affect the zone temperature $T_{zone}$ and/or the supply air temperature $T_{sa}$. In some embodiments, step 1112 includes operating the battery power inverter to achieve the battery power setpoint $P_{sp,bat}$. For example, step 1112 can include causing the battery power inverter to charge battery 213 or discharge battery 213 in accordance with the battery power setpoint $P_{sp,bat}$.

RTU Control Process

Referring now to FIG. 12, a flowchart of a process 1200 for operating a rooftop unit (RTU) is shown, according to an exemplary embodiment. In some embodiments, process 1200 is performed by one or more components RTU 700, as described with reference to FIGS. 7-10. For example, process 1200 can be performed by predictive RTU controller 702.

Process 1200 is shown to include receiving, at an RTU, energy prices for each of a plurality of time steps in an optimization period (step 1202). In some embodiments, the energy prices are time-varying energy prices which may have different values for different time steps of the optimization period. The energy prices can include a cost per unit of electricity $C_{ec}$ (e.g., \$/kWh) and/or a demand cost $C_{DC}$ (e.g., \$/kW of maximum power consumption). In some embodiments, the energy prices include a cost per unit of a fuel resource $C_{gas}$ (e.g., natural gas) supplied to the RTU.

Process 1200 is shown to include using the energy prices as inputs to a cost function that defines a cost of operating the RTU over a duration of the optimization period (step 1204). An example of a predictive cost function which can be used in step 1204 is shown in the following equation:

$$\min(J) = \sum_{k=1}^{h} C_{ec}(k) P_{comp}(k) \Delta t + \sum_{k=1}^{h} C_{ec}(k) P_{fan}(k) \Delta t + \sum_{k=1}^{h} C_{gas}(k) F_{gas}(k) \Delta t + C_{DC} \max_{k}(P_{grid}(k)) - \sum_{k=1}^{h} C_{ec}(k) P_{bat}(k) \Delta t$$

where $C_{ec}(k)$ is the cost per unit of electricity (e.g., \$/kWh) purchased from electric utility 512 during time step k, $P_{fan}(k)$ is the power consumption (e.g., kW) of compressor 874 during time step k, $P_{fan}(k)$ is the power consumption (e.g., kW) of fan 838 during time step k, $C_{gas}(k)$ is the cost per unit of gas (e.g., \$/liter) consumed by RTU 700 at time step k, $F_{gas}(k)$ is the flow rate of the gas provided to RTU 700 by the heated fluid (e.g., liter/s) at time step k, $C_{DC}$ is the demand charge rate (e.g., \$/kW), the max( ) term selects the maximum power consumption of RTU 700 (i.e., the maximum value of $P_{grid}(k)$) during any time step k of the optimization period, $P_{bat}(k)$ is the amount of power discharged from battery 713 during time step k, and $\Delta t$ is the duration of each time step k.

Process 1200 is shown to include optimizing the cost function to determine optimal power setpoints for powered RTU components and for a battery of the AHU (step 1206). Step 1206 can be performed by economic controller 1010. In some embodiments, the cost function is optimized subject to a set of optimization constraints. The optimization constraints can include constraints on the zone temperature $T_{zone}$, constraints on the battery power $P_{bat}$, constraints on the state-of-charge of the battery, constraints on the gas flow rate $F_{gas}$, constraints on the operational domain of the powered RTU components, and/or any other constraints which can be used to limit the optimization to a feasible solution. Examples of such constraints are described in detail with reference to FIG. 10.

The optimal power setpoints generated in step 1206 can include an optimal amount of power to purchase from an energy grid (i.e., a grid power setpoint $P_{sp,grid}$), an optimal amount of power to store or discharge from the battery (i.e., a battery power setpoint $P_{sp,bat}$), and/or an optimal amount of power to be consumed by the powered RTU components (i.e., an RTU power setpoint $P_{sp,total}$) at each time step of an optimization period. In some embodiments, these power setpoints are decision variables in the cost function. In other embodiments, one or more of the power setpoints can be calculated based on the values of the decision variables. For example, the power setpoint $P_{sp,total}$ can be calculated by summing $P_{sp,grid}$, $P_{sp,bat}$, and $P_{sp,PV}$. In some embodiments, step 1206 includes determining an optimal fan power setpoint $P_{sp,fan}$ and/or an optimal compressor power setpoint $P_{sp,comp}$. The sum of the optimal fan power setpoint $P_{sp,fan}$ and the optimal compressor power setpoint $P_{sp,comp}$ may be equivalent to the amount of power to be consumed by the powered RTU components (e.g., $P_{sp,fan} + P_{sp,comp} = P_{sp,total}$).

Process 1200 is shown to include using the optimal power setpoints to generate temperature setpoints for a zone temperature or supply air temperature affected by the RTU (step 1208). In some embodiments, step 1208 is performed by tracking controller 1012. Step 1208 can include using the optimal power setpoints $P_{sp,grid}$, $P_{sp,bat}$, $P_{sp,total}$, $P_{sp,fan}$, and/or $P_{sp,comp}$ generated in step 1206 to determine a zone temperature setpoint $T_{sp,zone}$ and/or a supply air temperature setpoint $T_{sp,sa}$. In some embodiments, step 1208 includes generating a zone temperature setpoint $T_{sp,zone}$ and/or a supply air temperature setpoint $T_{sp,sa}$ that are predicted to achieve the power setpoint $P_{sp,total}$ for the RTU. In other words, step 1208 may include generating a zone temperature setpoint $T_{sp,zone}$ and/or a supply air temperature setpoint $T_{sp,sa}$ that cause the RTU to consume the optimal amount of power $P_{total}$ determined in step 1206. An example of how the temperature setpoints can be generated based on the power setpoints is described in detail with reference to FIG. 10.

Process 1200 is shown to include using the temperature setpoints to generate control signals for the powered RTU components (step 1210). In some embodiments, step 1210 is performed by equipment controller 1014. The control signals generated in step 1210 may drive the actual (e.g., measured) temperatures $T_{zone}$ and/or $T_{sa}$ to the setpoints. Step 1210 can include using any of a variety of control techniques to generate control signals for the powered RTU components. For example, step 1210 can include using state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for the powered RTU components.

The control signals may include on/off commands, speed setpoints for fan 838 and compressor 874, position setpoints for fuel valve 852, or other operating commands for individual devices of powered the RTU components. In some embodiments, step 1210 includes using a feedback control technique (e.g., PID, ESC, MPC, etc.) to adjust the speed of fan 838 and/or compressor 874 to adjust the amount of cooling applied to supply air 710 to drive the measured temperatures $T_{zone}$ and/or $T_{sa}$ to the temperature setpoints $T_{sp,zone}$ and/or $T_{sp,sa}$. Similarly, step 1210 can include using a feedback control technique to control the position of fuel valve 852 to adjust the amount of heating applied to supply air 710 to drive the measured temperatures $T_{zone}$ and/or $T_{sa}$ to the temperature setpoints $T_{sp,zone}$ and/or $T_{sp,sa}$. In some embodiments, step 1210 includes generating control signals for a battery power inverter. The control signals for the battery power inverter can include a battery power setpoint $P_{sp,bat}$ and/or the optimal charge/discharge rate $Bat_{C/D}$.

Process 1200 is shown to include operating the powered RTU components to achieve the temperature setpoints (step 1212). In some embodiments, step 1212 includes providing the control signals generated in step 1210 to the powered RTU components. The control signals may control the operation of the powered RTU components, thereby causing the powered RTU components to affect the zone temperature $T_{zone}$ and/or the supply air temperature $T_{sa}$. In some embodiments, step 1212 includes operating the battery power inverter to achieve the battery power setpoint $P_{sp,bat}$. For example, step 1212 can include causing the battery power inverter to charge battery 713 or discharge battery 713 in accordance with the battery power setpoint $P_{sp,bat}$.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An air handling unit (AHU) in a building HVAC system, the AHU comprising:
   one or more powered AHU components comprising a fan configured to generate a supply airstream provided to one or more building zones;
   a battery configured to store electric energy from an energy grid and discharge the stored electric energy for use in powering the powered AHU components; and
   a predictive AHU controller configured to optimize a predictive cost function to determine an optimal amount of electric energy to purchase from the energy grid and an optimal amount of electric energy to store in the battery or discharge from the battery for use in powering the powered AHU components at each time step of an optimization period.

2. The AHU of claim 1, wherein the predictive cost function accounts for:
   a cost of the electric energy purchased from the energy grid at each time step of the optimization period; and
   a cost savings resulting from discharging stored electric energy from the battery at each time step of the optimization period.

3. The AHU of claim 1, wherein the predictive AHU controller is configured to:
   receive energy pricing data defining a cost per unit of electric energy purchased from the energy grid at each time step of the optimization period; and
   use the energy pricing data as inputs to the predictive cost function.

4. The AHU of claim 1, further comprising one or more heating elements or cooling elements positioned within the supply airstream and configured to apply heating or cooling to the supply airstream;
   wherein the predictive cost function accounts for a cost of generating the heating or cooling applied to the supply airstream at each time step of the optimization period.

5. The AHU of claim 4, wherein the heating elements are configured to receive a heated fluid from a heater subplant and the cooling elements are configured to receive a chilled fluid from a chiller subplant;
   wherein the predictive AHU controller is configured to estimate the cost of generating the heating or cooling applied to the supply airstream based on a subplant curve for the heater subplant or the chiller subplant, the subplant curve defining a relationship between resource consumption and an amount of heating or cooling generated by the heater subplant or the chiller subplant.

6. The AHU of claim 1, wherein the predictive cost function accounts for a demand charge based on a maximum power consumption of the AHU during a demand charge period that overlaps at least partially with the optimization period;
   wherein the predictive AHU controller is configured to receive energy pricing data defining the demand charge and to use the energy pricing data as inputs to the predictive cost function.

7. The AHU of claim 1, wherein the predictive AHU controller comprises:
   an economic controller configured to determine optimal power setpoints for the powered AHU components and for the battery at each time step of the optimization period;
   a tracking controller configured to use the optimal power setpoints to determine optimal temperature setpoints for the building zones or the supply air stream at each time step of the optimization period; and
   an equipment controller configured to use the optimal temperature setpoints to generate control signals for the powered AHU components and for the battery at each time step of the optimization period.

8. A rooftop unit (RTU) in a building HVAC system, the RTU comprising:
   one or more powered RTU components comprising a fan configured to generate a supply airstream provided to one or more building zones;
   a battery configured to store electric energy and discharge the stored electric energy for use in powering the powered RTU components; and
   a predictive RTU controller configured to optimize a predictive cost function to determine an optimal amount of electric energy to purchase from an energy grid and an optimal amount of electric energy to store in the battery or discharge from the battery for use in powering the powered RTU components at each time step of an optimization period.

9. The RTU of claim 8, further comprising one or more photovoltaic panels configured to collect photovoltaic energy;
   wherein the predictive RTU controller is configured to determine an optimal amount of the photovoltaic energy to store in the battery and an optimal amount of the photovoltaic energy to be consumed by the powered RTU components at each time step of the optimization period.

10. The RTU of claim 8, wherein the predictive cost function accounts for a cost of the electric energy purchased from the energy grid and a cost savings resulting from discharging stored electric energy from the battery at each time step of the optimization period;
    wherein the predictive RTU controller is configured to:
    receive energy pricing data defining a cost per unit of electric energy purchased from the energy grid at each time step of the optimization period; and
    use the energy pricing data as inputs to the predictive cost function.

11. The RTU of claim 8, further comprising a refrigeration circuit including an evaporator positioned within the supply airstream and configured to apply cooling to the supply airstream;
    wherein the powered RTU components further comprise a compressor configured to compress a refrigerant in the refrigeration circuit and circulate the refrigerant through the evaporator;
    wherein the predictive cost function accounts for a cost of operating the compressor at each time step of the optimization period.

12. The RTU of claim 8, further comprising burner positioned within the supply airstream and configured to apply heating to the supply airstream by burning a combustible fuel;
    wherein the predictive cost function accounts for a cost of the fuel consumed by the burner at each time step of the optimization period.

13. The RTU of claim 8, wherein the predictive cost function accounts for a demand charge based on a maximum power consumption of the RTU during a demand charge period that overlaps at least partially with the optimization period;
    wherein the predictive RTU controller is configured to receive energy pricing data defining the demand charge and to use the energy pricing data as inputs to the predictive cost function.

14. The RTU of claim 8, wherein the predictive RTU controller comprises:
- an economic controller configured to determine optimal power setpoints for the powered RTU components and for the battery at each time step of the optimization period;
- a tracking controller configured to use the optimal power setpoints to determine optimal temperature setpoints for the building zones or the supply air stream at each time step of the optimization period; and
- an equipment controller configured to use the optimal temperature setpoints to generate control signals for the powered RTU components and for the battery at each time step of the optimization period.

15. A method for operating an air handling unit (AHU) or rooftop unit (RTU) in a building HVAC system, the method comprising:
- receiving, at the AHU or RTU, energy pricing data defining energy prices for each of a plurality of time steps in an optimization period;
- using the energy pricing data as inputs to a predictive cost function that defines a cost of operating the AHU or RTU over a duration of the optimization period;
- optimizing the predictive cost function to determine optimal power setpoints for one or more powered components of the AHU or RTU and for a battery of the AHU or RTU;
- using the optimal power setpoints to generate temperature setpoints for a zone temperature or supply air temperature affected by the AHU or RTU;
- using the temperature setpoints to generate control signals for the powered components of the AHU or RTU; and
- operating the powered components of the AHU or RTU to achieve the temperature setpoints.

16. The method of claim 15, wherein optimizing the predictive cost function comprises determining an optimal amount of electric energy to purchase from an energy grid and an optimal amount of electric energy to store in the battery or discharge from the battery for use in powering the powered components of the AHU or RTU at each time step of an optimization period.

17. The method of claim 15, further comprising operating a fan of the AHU or RTU to generate a supply airstream and provide the supply airstream to one or more building zones;
- wherein the fan is one of the powered components of the AHU or RTU.

18. The method of claim 17, further comprising operating one or more heating elements or cooling elements positioned within the supply airstream to apply heating or cooling to the supply airstream;
- wherein the predictive cost function accounts for a cost of generating the heating or cooling applied to the supply airstream at each time step of the optimization period.

19. The method of claim 17, further comprising operating a compressor to circulate a refrigerant through an evaporator positioned within the supply airstream;
- wherein the compressor is one of the powered components of the AHU or RTU;
- wherein the predictive cost function accounts for a cost of operating the compressor at each time step of the optimization period.

20. The method of claim 15, wherein the predictive cost function accounts for a demand charge based on a maximum power consumption of the AHU or RTU during a demand charge period that overlaps at least partially with the optimization period;
- the method further comprising using the energy pricing data as inputs to the predictive cost function to define the demand charge.

* * * * *